United States Patent
Doughty et al.

(10) Patent No.: US 11,740,182 B2
(45) Date of Patent: Aug. 29, 2023

(54) MULTIMODAL NONLINEAR OPTICAL IMAGING VIA EVANESCENT WAVE EXCITATION

(71) Applicant: UT-Battelle, LLC, Oak Ridge, TN (US)

(72) Inventors: Benjamin L. Doughty, Knoxville, TN (US); Yingzhong Ma, Oak Ridge, TN (US); Uvinduni Premadasa, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/726,906

(22) Filed: Apr. 22, 2022

(65) Prior Publication Data

US 2022/0341849 A1    Oct. 27, 2022

Related U.S. Application Data

(60) Provisional application No. 63/178,670, filed on Apr. 23, 2021.

(51) Int. Cl.
*G01N 21/64*      (2006.01)
*G01N 21/552*     (2014.01)
(Continued)

(52) U.S. Cl.
CPC ......... *G01N 21/648* (2013.01); *G01N 21/552* (2013.01); *G01N 21/65* (2013.01);
(Continued)

(58) Field of Classification Search
None
See application file for complete search history.

(56) References Cited

U.S. PATENT DOCUMENTS

2021/0381986 A1    12/2021    Doughty et al.

OTHER PUBLICATIONS

Hofer, M. et al.,"High-speed polarization-resolved coherent Raman scattering imaging," Optica 4, 795-801 (2017) (Year: 2017).*

(Continued)

*Primary Examiner* — Tarifur R Chowdhury
*Assistant Examiner* — Roberto Fabian, Jr.
(74) *Attorney, Agent, or Firm* — Scully, Scott, Murphy & Presser, P.C.

(57) ABSTRACT

A system for multimodal nonlinear optical imaging is provided. Each mode uses a high NA objective to cause total internal reflection excitation at a sample-substrate interface. The system has a femtosecond oscillator to generate pulses used for two beams. The objective receives at least one beam, redirects the received at least one beam through a dielectric substrate to cause the TIR and produces corresponding evanescent waves in a portion of the sample adjacent to the sample-substrate interface, and collects a backward-propagating beam of pulses of responsive light. The portion of the sample illuminated by the evanescent waves emits responsive light. Different modes or combinations of the distinct modalities may be selected to access complementary chemical and structural information for various chemical species near the sample-substrate interface. Each mode may have mode-specific control such as selective beam blocking, power ratios and filtering.

21 Claims, 26 Drawing Sheets

(51) Int. Cl.
  *G02F 1/35* (2006.01)
  *H01S 3/00* (2006.01)
  *G01N 21/65* (2006.01)

(52) U.S. Cl.
  CPC .......... *G02F 1/3532* (2013.01); *H01S 3/0057* (2013.01); *H01S 3/0092* (2013.01); *G01N 2021/653* (2013.01); *G01N 2201/06113* (2013.01)

(56) References Cited

OTHER PUBLICATIONS

Pegoraro, Adrian F., et al. "Optimally chirped multimodal CARS microscopy based on a single Ti: sapphire oscillator." Optics express 17.4 (2009): 2984-2996 (Year: 2009).*

Oheim, Martin, et al. "Principles of two-photon excitation fluorescence microscopy and other nonlinear imaging approaches." Advanced drug delivery reviews 58.7 (2006): 788-808 (Year: 2006).*

Blake, M. et al., "Leaving the Limits of Linearity for Light Microscopy", J. Phys. Chem. C, 2020, pp. 24555-24565, vol. 124, No. 45.

Yue, S. et al., "Multimodal nonlinear optical microscopy", Laser Photonics Rev., 2011, pp. 496-512, vol. 5, No. 4.

Oheim, M. et al., "Principles of two-photon excitation fluorescence microscopy and other nonlinear imaging approaches", Adv. Drug Delivery Rev., 2006, pp. 788-808, vol. 58.

Lambert, A. et al., "Implementing the Theory of Sum Frequency Generation Vibrational Spectroscopy: A Tutorial Review", Appl. Spectrosc. Rev., 2005, pp. 103-145, vol. 40.

Khmaladze, A. et al., "Hyperspectral Imaging and Characterization of Live Cells by Broadband Coherent Anti-Stokes Raman Scattering (CARS) Microscopy with Singular Value Decomposition (SVD) Analysis", Appl. Spectrosc., Nov. 10, 2014, pp. 1116-1122, vol. 68, No. 10.

Doughty, B. et al., "Total internal reflection enabled wide-field coherent anti-Stokes Raman scattering microscopy", Opt. Lett., Jun. 2020, pp. 3087-3090, vol. 45, No. 11.

Heinrich, C. et al., "Wide-field coherent anti-Stokes Raman scattering microscopy", Appl. Phys. Lett., Feb. 2, 2004, pp. 816-818, vol. 84, No. 5.

Fast, A. et al., "Surface-enhanced coherent anti-Stokes Raman imaging of lipids", Appl. Opt., 2016, pp. 5994-6000, vol. 55, No. 22.

Shen, Y. et al., "Wide-field coherent anti-Stokes Raman scattering microscopy based on picosecond supercontinuum source", APL Photonics, 2018, pp. 116104-1 to 116104-8, vol. 3.

Toytman, I. et al., "On illumination schemes for wide-field CARS microscopy", Opt. Express, 2009, pp. 7339-7347, vol. 17, No. 9.

Bordo, V. et al., "Two-Photon Evanescent-Volume Wave Spectroscopy: A New Account of Gas-Solid Dynamics in the Boundary Layer", Phys. Rev. Lett., 2001, pp. 1490-1493, vol. 86, No. 8.

Watson, B. et al., "Elucidation of Perovskite Film Micro-Orientations Using Two-Photon Total Internal Reflectance Fluorescence Microscopy", J. Phys. Chem. Lett., 2015, pp. 3283-3288, vol. 6.

Watson, B. et al., "Shedding Light on Surface Effects: Nonlinear Probes of Complex Materials", Proc. SPIE, 2018, pp. 106380M-1 to 106380M-8.

Watson, B. et al., "Energetics at the Surface: Direct Optical Mapping of Core and Surface Electronic Structure in CdSe Quantum Dots Using Broadband Electronic Sum Frequency Generation Microspectroscopy", Nano Lett., 2019, pp. 6157-6165, vol. 19.

Heinrich, C. et al., "Selective imaging of saturated and unsaturated lipids by wide-field CARS-microscopy", Opt. Express, 2008, pp. 2699-2708, vol. 16, No. 4.

Berto, P. et al., "Wide-field vibrational phase imaging in an extremely folded box-CARS geometry", Opt. Lett., 2013, pp. 709-711, vol. 38, No. 5.

Hellerer, T. et al., "Spectral focusing: High spectral resolution spectroscopy with broadbandwidth laser pulses", Appl. Phys. Lett., 2004, pp. 25-27, vol. 85, No. 1.

Polli, D. et al., "Broadband Coherent Raman Scattering Microscopy", Laser Photonics Rev., 2018, pp. 1-36, vol. 12.

Pegoraro, A. et al., "Optimally chirped multimodal CARS microscopy based on a single Ti:sapphire oscillator", Opt. Express, 2009, pp. 2984-2996, vol. 17, No. 4.

* cited by examiner

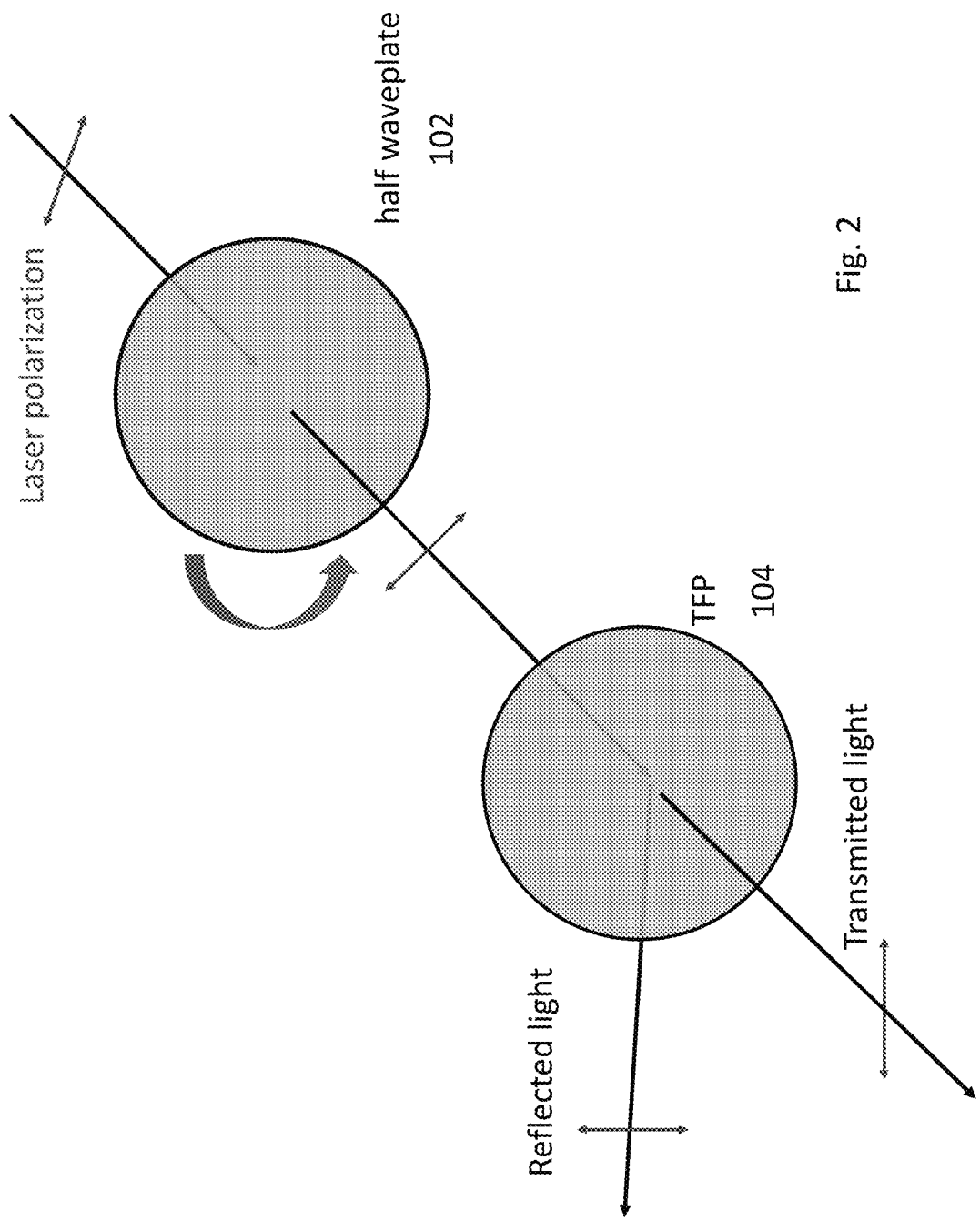

| HWP Angle | Power-Pump (mW) | Power-Stokes (mW) |
|---|---|---|
| 0 | 375.0 | 603.0 |
| 10 | 98.30 | 868.0 |
| 20 | 3.045 | 952.0 |
| 30 | 138.7 | 822.0 |
| 40 | 430.0 | 528.0 |
| 50 | 744.0 | 226.2 |
| 60 | 934.0 | 30.67 |
| 70 | 917.3 | 59.30 |
| 80 | 694.0 | 286.5 |
| 90 | 365.0 | 601.0 |
| 100 | 84.70 | 869.0 |
| 110 | 5.120 | 951.0 |
| 120 | 133.9 | 816.0 |
| 130 | 426.0 | 525.0 |
| 140 | 741.0 | 221.0 |
| 150 | 930.0 | 33.20 |
| 160 | 907.0 | 61.50 |
| 170 | 740.0 | 283.0 |
| 180 | 352.0 | 615.0 |
| 190 | 82.50 | 877.0 |
| 200 | 4.980 | 949.0 |
| 210 | 137.3 | 805.0 |
| 220 | 432.0 | 524.0 |
| 230 | 741.0 | 198.1 |
| 240 | 934.0 | 29.90 |
| 250 | 902.0 | 54.50 |
| 260 | 665.0 | 291.8 |
| 270 | 375.0 | 603.0 |
| 280 | 99.50 | 865.0 |
| 290 | 2.953 | 961.0 |
| 300 | 85.10 | 836.0 |
| 310 | 409.0 | 546.0 |
| 320 | 724.0 | 226.3 |
| 330 | 932.0 | 37.10 |
| 340 | 920.0 | 51.80 |
| 350 | 713.0 | 274.7 |

| Modality | Power Split between Pump (first) beam and the Stokes (Chirped) beam | | | Power Split between Pump (first) beam and the Stokes (Chirped) beam | | |
|---|---|---|---|---|---|---|
| | Highest Signal | | | Lowest Signal | | |
| | Pump (mW) | Stokes (mW) | Optimum Power Split Ratio (Pump:Stokes) | Pump (mW) | Stokes (mW) | Power Split Ratio (Pump:Stokes) – Lower end |
| SHG (P) | 954 | 22.03 | 43:1 | 22.1 | 861 | 1:39 |
| TPF (P) | 954 | 22.03 | 43:1 | 22.1 | 861 | 1:39 |
| SHG (S) | 22.8 | 937 | 1:41 | 578 | 396 | 1:1.5 |
| TPF (S) | 22.8 | 937 | 1:41 | 578 | 396 | 1:1.5 |
| SFG | 268.3 | 644 | 1:2 | 10.89 | 904 | 1:83 |
| | | | | 850 | 62.5 | 13.6:1 |
| CARS | 726 | 174 | 4:1 | 24.46 | 889 | 1:36 |
| | | | | 860 | 53.4 | 16:1 |

Fig. 4B

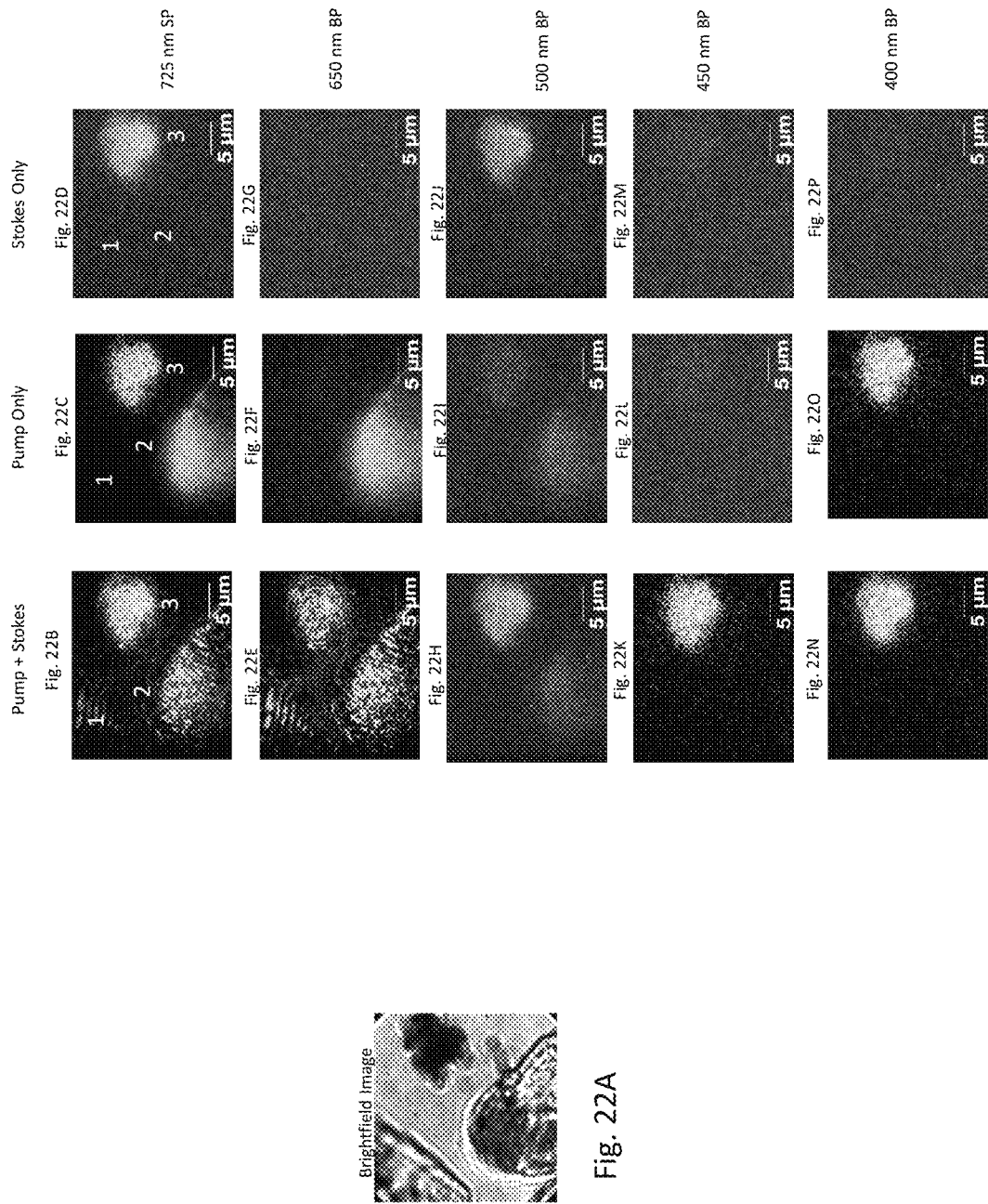

MULTIMODAL NONLINEAR OPTICAL IMAGING VIA EVANESCENT WAVE EXCITATION

CROSS-REFERENCE TO RELATED APPLICATIONS

This application claims the benefit of and priority to U.S. Provisional Application Ser. No. 63/178,670 filed on Apr. 23, 2021, the entirety of which is incorporated by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to nonlinear optical imaging with different imaging microscopy modes using total internal reflection.

BACKGROUND

There are many different nonlinear optical imaging techniques (microscopy modes). Examples of these techniques include coherent anti-Stokes Raman scattering (CARS) microscopy, two-photon fluorescence (TPF), second harmonic generation (SHG) and sum frequency generation (SFG).

CARS microscopy is one way to obtain chemical images of complex and living biological systems, due to its intrinsic vibrational contrast, high sensitivity and capability for three-dimensional sectioning. As a nonlinear four-wave mixing phenomenon, the CARS process is driven by a pump pulse at frequency $\omega_p$ and a Stokes pulse at $\omega_s$. When the frequency difference of these pulses $\omega_p-\omega_s$ matches the frequency of a Raman active molecular vibration, a strong anti-Stokes signal arises at $\omega_{as}=2\omega_p-\omega_s$ in a well-defined phase-matched direction. This resonance condition provides a means to target specific vibrational chromophores in complex media without the need to label and possibly perturb the sample of interest.

TPF is an imaging technique in which a fluorophore is excited by absorption of two incident photons. The absorption creates an electronic excited state from which relaxation back to a ground state results in the emissions of Stokes shifted fluorescence photons with higher energy than the incident photons. TPF may provide three-dimensional in vivo imaging of cells and tissues.

SHG is an imaging technique where photons interacting with a non-linear material are combined to formed new photon(s) having twice the frequency of the incident photons, e.g., upconverted. SHG may also be used for in vivo imaging of tissues such as collagen fibers and connecting tissues.

SFG is an imaging technique that uses two laser beams that mix at a surface of the sample and generate an output beam with a frequency equal to a sum of the input laser beams.

In a known imaging system, each of these techniques may be performed in a separate platform and images may be separately obtained.

In other known imaging systems, where some of these techniques are performed on the same platform, imaging is executed via a point scanning technique with a focused beam to provide a sufficiently high excitation field necessary for generating nonlinear optical phenomena.

U.S. Application Publication No. 2021/0381986 describes a total internal reflection (TIR) enabled wide-field CARS microscopy system. The system uses an oscillator laser to seed temporally chirped broadband near-infrared Stokes pulses and asymmetric pump pulses. A high NA objective is positioned near a sample to generate the TIR at a substrate-sample interface. This causes an evanescent field to be emitted near the sample-substrate interface. Responsive light by the sample, e.g., CARS is emitted back through the objective. This light may be seen as the image.

SUMMARY

In accordance with aspects of the disclosure, multiple nonlinear optical image modes may be used on the same platform. Each mode may leverage an objective based total internal reflection excitation for the imaging. Different combinations of the distinct modalities may be selected to access complementary chemical and structural information for various chemical species near an interface between a sample of interest and a substrate.

Accordingly, disclosed is a system for multimodal nonlinear optical imaging which may comprise an oscillator, a beam splitter, a photonic crystal fiber (PCF), a controllable beam block, objective optics, a filter module and a camera. The oscillator may be configured to emit femtosecond pulses of light centered at a preset wavelength. The beam splitter may be disposed in a path of the emitted pulses of light and configured to split the emitted light into pulses for a first beam and a second beam. The PCF may be disposed in a path of the second beam and configured to produce pulses for a chirped beam. The controllable beam block may be configured to selectively block a path of the first beam or the chirped beam or neither the first beam nor the chirped beam in response to a mode-selection. The objective optics may be configured to receive, based on the selected insertion of the beam block, at least one beam, redirect the at least one received beam through a dielectric substrate towards an interface between a sample and a dielectric substrate to cause total internal reflection (TIR) of at least one redirected beam at the sample-substrate interface, and produce corresponding evanescent waves in a portion of the sample adjacent to the sample-substrate interface. The portion of the sample illuminated by the evanescent waves emits responsive light. The at least one beam may be either the first beam or the chirped beam or both the first beam and the chirped beam. If both the first beam and the chirped beam are received by the objective optics, the first beam and the chirped beam may be spatially and temporally aligned. The sample may be disposed on the dielectric substrate. The dielectric substrate may be transparent to both the first beam and the chirped beam and to the responsive light emitted by the portion of the sample. The responsive light may have a spectrum that comprises a first-beam-induced second-harmonic generation (p-SHG) spectral band and a first-beam-induced two-photon fluorescence (p-TPF) spectral band, (ii) a chirped-beam-induced second-harmonic generation (s-SHG) spectral band and a chirped-beam-induced two-photon fluorescence (s-TPF) spectral band, (iii) the p-SHG spectral band, the p-TPF spectral band, the s-SHG spectral band, the s-TPF spectral band, a sum-frequency generation (SFG) spectral band and a coherent anti-Stokes Raman scattering (CARS) spectral band. The objective optics may further collect a backwards-propagating beam of the pulses of responsive light that propagates from the portion of the sample through the dielectric substrate towards the objective optic. The filter module may be configured to receive, from the objective optics, the backwards-propagating beam, and selectively filter the spectrum of the responsive light in one or more of the p-SHG spectral band, the SFG spectral band, the s-SHG spectral band, the s-TPF spectral band, the CARS spectral band, or the p-TPF spectral band in accordance with the mode-selection to produce a filtered beam. The camera may be configured to produce an image of the sample having a specific image size using the filtered beam.

In an aspect of the disclosure, the first beam and the chirped beam that are incident on the sample may be P-polarized.

In an aspect of the disclosure, the controllable beam block may comprise a first solenoid shutter and a second solenoid shutter. The first solenoid shutter may be positioned in the path of the first beam and may be configured to open or close to selectively block the first beam. The second solenoid may be positioned in the path of the chirped beam and may be configured to open or close to selectively block the chirped beam. The system may further comprise a processor configured to control a state of the first solenoid shutter and the second solenoid shutter. In other aspects, the controllable beam block may comprise a motor. A processor may be configured to control the motor to position the controllable beam block in the path of the first beam or in the path of the chirped beam or neither in the path of the first beam nor the chirped beam.

In an aspect of the disclosure, the system may further comprise a power regulator. The power regulator may be configured to provide a power ratio of the first beam and the second beam. In an aspect of the disclosure, the power ratio may be based on the mode-selection. In an aspect of the disclosure, the power regulator may comprise at least rotatable half waveplate. A processor may be configured to rotate the rotatable half waveplate based on the mode-selection. In an aspect of the disclosure, the power ratio may be further based on a sample type.

In an aspect of the disclosure, the filter module may comprise a short pass filter. In other aspects, the filter module may further comprise a plurality of selectable filters. In an aspect, a filter may be selected based on the mode-selection. A processor may be configured to a selected filter in a path of the received backwards-propagating beam from the objective optics. The selected filters may be in a filter wheel. One of the spaces in the filter wheel for a filter may be empty.

In an aspect of the disclosure, the system may further comprise a user interface. The user interface may be configured to receive the mode-selection. In an aspect of the disclosure, the mode-selection may contain a request an image generated from one or more imaging modalities.

In an aspect of the disclosure, when the received mode-section is for a p-SHG image of the sample, a p-TPF image of the sample or a combined p-SHG and p-TPF image of the sample, the controllable beam block may block the path of the chirped beam when the request is for the p-SHG image of the sample, the p-TPF image of the sample or the combine p-SHG and p-TPF image of the sample. The objective optics may receive the first beam and redirect the received first beam through the dielectric substrate towards the sample-substrate interface to cause TIR of the redirected first beam at the sample-substrate interface and produce corresponding evanescent waves in the portion of the sample adjacent to the sample-substrate interface. The portion of the sample illuminated by the evanescent waves emits the responsive light having a spectrum formed from the p-SHG spectral band and the p-TPF spectral band. When the request is for the p-SHG image of the sample, the filter module may be configured to filter the spectrum of the responsive light in the p-SHG spectral band, and the camera may be configured to produce the requested p-SHG image of the sample using the filtered beam. When the request is for the p-TPF image of the sample, the filter module may be configured to filter the spectrum of the responsive light in the p-TPF spectral band, and the camera may be configured to produce the requested p-TPF image of the sample using the filtered beam. When request is for the combined p-SHG and p-TPF image of the sample, the filter module may be configured to filter the spectrum of the responsive light in the p-SHG spectral band and the p-TPF spectral band, and the camera may be configured to produce the requested combined p-SHG and p-TPF image of the sample using the filtered beam.

In an aspect of the disclosure, when the received mode-section is for a s-SHG image of the sample, a s-TPF image of the sample or a combined s-SHG and s-TPF image of the sample, the controllable beam block may block the path of the first beam when the request is for the s-SHG image of the sample, the s-TPF image of the sample or the combined s-SHG and s-TPF image of the sample. The objective optics may receive the chirped beam, redirect the received chirped beam through the dielectric substrate towards the sample-substrate interface to cause TIR of the redirected chirped beam at the sample-substrate interface, and produce corresponding evanescent waves in the portion of the sample adjacent to the sample-substrate interface. The portion of the sample illuminated by the evanescent waves emits the responsive light having a spectrum formed from the s-SHG spectral band and the s-TPF spectral band. When the request is for the s-SHG image of the sample, the filter module may be configured to filter the spectrum of the responsive light in the s-SHG spectral band, and the camera may be configured to produce the requested s-SHG image of the sample using the filtered beam. When the request is for the s-TPF image of the sample, the filter module may be configured to filter the spectrum of the responsive light in the s-TPF spectral band, and the camera may be configured to produce the requested s-TPF image of the sample using the filtered beam. When the request is for the combined s-SHG and s-TPF image of the sample, the filter module may be configured to filter the spectrum of the responsive light in the s-SHG spectral band and the s-TPF spectral band, and the camera may be configured to produce the requested combined s-SHG and s-TPF image of the sample using the filtered beam.

In an aspect of the disclosure, when the received mode-section is for SFG image of the sample, a CARS image of the sample or a combined SFG and CARS image of the sample, the path for both the first beam and the chirped beam is unblocked by the controllable beam block. The objective optics may receive the first beam and the chirped beam and redirect the received first beam and the chirped beam through the dielectric substrate towards the sample-substrate interface to cause TIR of the redirected first beam and chirped beam at the sample-substrate interface, and produce corresponding evanescent waves in the portion of the sample adjacent to the sample-substrate interface. The portion of the sample illuminated by the evanescent waves emits the responsive light having a spectrum formed from at least the SFG spectral band and the CARS spectral band. When the request is for the SFG image of the sample, the filter module may be configured to filter the spectrum of the responsive light in the SFG spectral band, and the camera may be configured to produce the requested SFG image of the sample using the filtered beam. When the request is for the CARS image of the sample, the filter module may be configured to filter the spectrum of the responsive light in the CARS spectral band, and the camera may be configured to produce the requested CARS image of the sample using the filtered beam. When the request is for the combined SFG and CARS image of the sample, the filter module may be configured to filter the spectrum of the responsive light in the SFG spectral band and the CARS spectral band, and the camera may be configured to produce the requested combined SFG and CARS image of the sample using the filtered beam.

In an aspect of the disclosure, the system may be configured to correct a CARS image, a SFG image or a combined SFG and CARS image when there is an overlap in spectrum with other modalities. In an aspect of the disclosure, the correction may comprise obtaining the p-TPF image or the s-TPF image by controlling the controllable beam block to block the path of the chirped beam and controlling the filter module to filter the spectrum of the responsive light in the p-TPF band or the s-TPF band and subtracting data from the p-TPF image or the s-TPF image from data from the CARS image or from the SFG image or from the combined SFG and CARS image.

In an aspect of the disclosure, the system may produce images of an opaque sample.

In an aspect of the disclosure, the system may also produce spectroscopic images. In an aspect of the disclosure, the system may further comprise collection optics and a spectrograph. The collection optics may be configured to collect forward-propagating responsive beam that propagates from the portion of the sample towards the objective optics. The spectrograph may be configured to receive, from the collection optics, the forward-propagating beam from the portion of the sample and produce a spectrum of the responsive light corresponding to the sample using the received forward-propagating beam. The spectrograph may also be used for calibration for the CARS imaging and the SFG imaging.

In an aspect of the disclosure, an illumination area of the sample and an image size on the camera may be independently controllable.

BRIEF DESCRIPTION OF THE DRAWINGS

FIG. 2 illustrates a half waveplate and thin film polarizer for power tuning and beam splitting in accordance with aspects of the disclosure;

FIG. 4B illustrates an example of power ranges used for different nonlinear optical imaging modes in accordance with aspects of the disclosure;

FIGS. 22A-22P illustrate images from a ternary test sample containing indole-3-acetic acid (IAA), malachite green oxalate dye (MG), and ZnS nanocrystals in accordance with aspects of the disclosure, wherein image FIG. 22A is a brightfield image and image FIGS. 22B-22P are images acquired using different beam blocking and filter conditions;

FIG. 23A is a brightfield image and images FIGS. 23B and 23C are composite CARS and TFP images, respectively; FIG. 24A is a brightfield image acquired prior to either the composite TPF image or the CARS image, FIG. 24B is a composite TPF image acquired prior to a CARS image, FIG. 24C is a CARS image and FIG. 24D is a composite TPF image acquired after the CARS image.

DETAILED DESCRIPTION

Figure 1A:
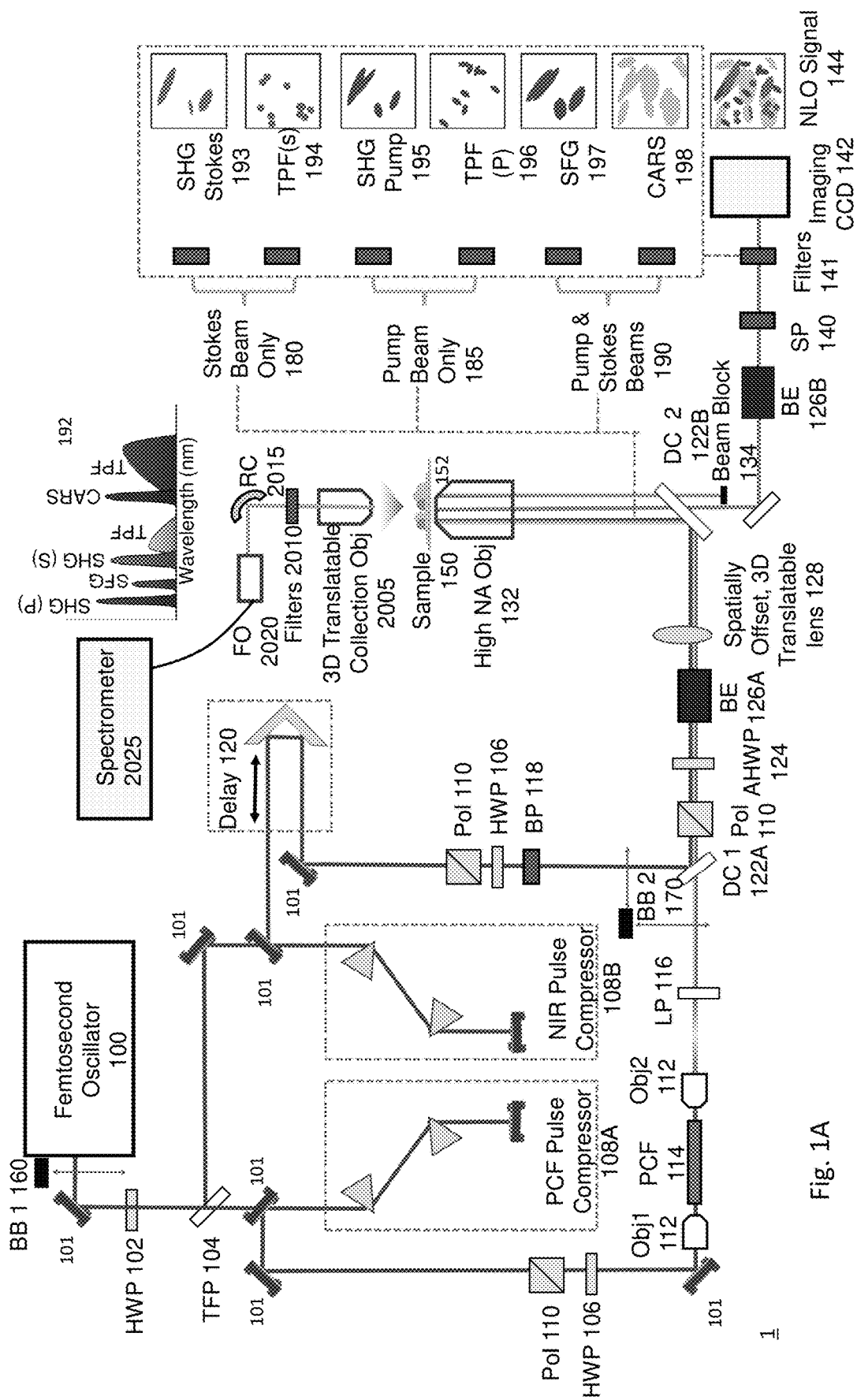
FIG. 1A illustrates a multimodal nonlinear optical imaging system and spectroscopy system in accordance with aspects of the disclosure.

FIG. 1A illustrates a multimodal nonlinear optical imaging system and spectroscopy system 1 in accordance with aspects of the disclosure. In accordance with aspects of the disclosure one or more nonlinear optical imaging modes may be imaged at the same time. This enables different microscopy and spectroscopy images. The different mode(s)

may be selected by a user. The nonlinear optical imaging mode includes coherent anti-Stokes Raman scattering (CARS) microscopy, two-photon fluorescence (TPF), second harmonic generation (SHG) and sum frequency generation (SFG). SHG and TPF may also have a pump mode and a Stokes mode. The spectroscopy measurements may be used for creating spectra from the mode(s) as well as for calibration. For example, the spectroscopy may be used to calibrate the delay 120 for CARS.

The microscopy system (and spectroscopy) is enabled by a total internal reflection (TIR) excitation scheme uses an oscillator 100 as a light source. The oscillator 100 is used as the seed for both spectrally asymmetric pump (first beam) and temporally chirped broadband near-infrared Stokes pulses (second beam).

"Chirped" used herein refers to a time dependence of the instantaneous frequency of an optical pulse. In other words, different frequencies in a beam will arrive at a given point in space at different times.

In accordance with aspects of the disclosure, the oscillator 100 is a femtosecond oscillator. An increase in the light intensity at the sample 150 can be achieved by using laser pulses with much shorter temporal durations, which will provide corresponding higher peak intensities and signal levels in the images, such as CARS.

In some aspects of the disclosure, the oscillator 100 may be a Ti:Sapphire laser, such as one available from Spectra-Physics® (e.g., a Tsunami). The laser may produce pulses between 20 and 100 fs. For example, the pulses may be about 50 fs. Shorter pulses such as, 20 fs, may produce more wavelengths, however, longer pulses such as, 100 fs, may have fewer colors but easier to differentiate responsive signals, such as CARS.

The center wavelength of the pulses may depend on the application. In an aspect of the disclosure, the center wavelength may be 800 nm-815 nm. For example, the center wavelength may be 809 nm. The light source may have a repetition rate above 70 MHz. For example, the repetition rate may be about 82 MHz. The pulses may have an average power between 1 W and 2 W. For example, the average power may be 1.4 W.

The system 1 may further comprise a beam block 1 160. This beam block acts as a cover for the oscillator 100. The beam block 1 160 may be manually moved from covering the oscillator and exposing a beam from the oscillator 100. In other aspects, the beam block 1 160 may be motorized and automatically moved in response to a user selection of modes and either spectroscopic or microscopic images. In other aspects, the beam block 1 160 may be automatically moved in response to the system 1 being powered ON. In other aspects, the beam block 1 160 may be a solenoid shutter. The solenoid shutter opening and closing to expose or block the beam from the oscillator 100.

The pulses from the oscillator 100 are separated into two different paths. The pulses from the oscillator 100 may be polarized, such as having a horizontal polarization. The pulses from the oscillator 100 may be guided or steered to a half waveplate 102 (HWP) by one or more mirrors 101. The angle of the mirror(s) may be adjusted based on the space of the setup, as needed. The HWP 102 provides for a controllable power for the light pulses (beams) for the different paths (in combination with thin film polarizer (TFP) 104). The combination acts as a power regulator. The HWP 102 rotates the polarization of the light exiting the half waveplate with respect to that entering the half waveplate.

In an aspect of the disclosure, different powers for the Stokes beam and the pump beam may be used for the different nonlinear imaging modes. As such, the power regulator may be controlled by a processor based on a user selection of the mode(s).

A thin film polarizer 104 (TFP) is positioned in the beam path exiting the HWP 102. The TFP 104 acts as a beam splitter dividing the incoming beam from the half waveplate 102 into the different light paths. The TFP 104 has a coating which reflects light pulses having a specific polarization and allows though light pulses having an orthogonal polarization.

FIG. 2 illustrates an example of the power regulator in accordance with aspects of the disclosure. The power regulator may be controlled by a processor (not shown in FIG. 2). As shown in FIG. 2, the pulses (beam) from the oscillator 100 have a horizontal polarization. The orientation of the HWP 102 rotates the polarization as desired. The HWP 102 may be mounted on a rotating stage and the angle of rotation of the HWP 102 may be controlled via a processor, as needed for the different modes. The rotation of polarization of the pulses to a specific angle between vertical and horizontal results in the pulses having a both vertical and horizontal components. The specific angle determines the relative amount of the vertical and horizontal components (after splitting).

Figure 4A:
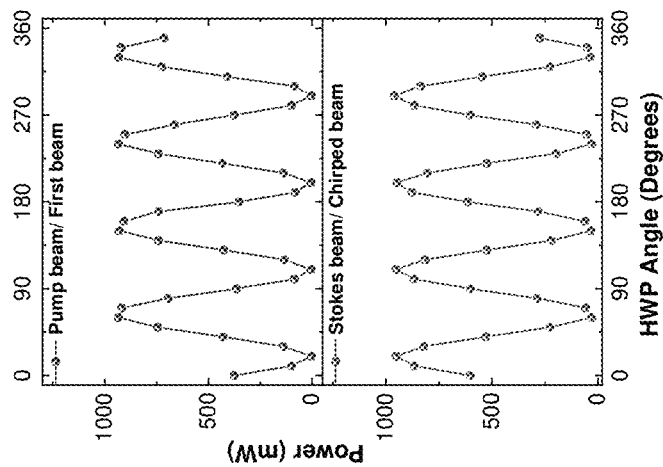
FIG. 4A illustrates an example of power ranges which may be changed using a power regulator such as shown in FIG. 2 in accordance with aspects of the disclosure.

FIG. 4A illustrates an example of a relationship between the angle of the HWP 102 and the power of the pump and Stokes pulses for the configuration shown in FIG. 1A. The power of the pulses may be changed from about 0 to about 1000 mW in this example. The power of the pump pulses and the Stokes pulses is inversely related. In an aspect of the disclosure, zero degrees is defined as the position that the HWP is initially placed into the rotatable mount. The different optics may be initially positioned at a different rotation for different mounts and HWPs. The angles and powers shown in FIG. 4A were determined with respect to the initial position/rotation during a calibration. The power also changes with periodicity, e.g., a similar power change occurs every 90 degrees of rotation. For example, a 90 degree rotation provides similar power levels as 180 degree rotation as can be seen in the charts. At about 60 degrees the pump pulses have a maximum power and the Stokes pulses has a minimum power. At about 290 degrees Stokes pulses has a maximum power and the pump pulses has a minimum power.

As noted above, the different nonlinear image modes may have a different operating power range(s). The operating power range for the different modes may be based on the sample 150 and property of interest. For example, different compositions in the sample 150 may result in different power levels for the same mode. FIG. 4B illustrates an example of operating power ranges for different nonlinear imaging modes in accordance with aspects of the disclosure. The range shows the "highest signal" and the "lowest signal" for each mode in the table. The lowest signal represents the lowest power level may be used to obtain a viewable image in the respective mode, e.g., see a minimal amount of a responsive signal. The highest signal represents the power level that results in a best viewable image, e.g., maximum responsive signal. The actual power level (ratio) used within the range may be based on the sample as noted above. As can be seen in FIG. 4B, the power levels for modes SHG(P) and TPF(P) are the same. This is because these modes use the same pump pulses. The power level of the Stokes pulses in these modes are not relevant as the Stokes pulses are blocked in these modes as described herein (only relevant because it impacts the pump power but is not incident on the sample). For these modes, the power ratio range may be between 43:1 and 1:39. Similarly, the power levels for SHG (S) and TPF (S) are the same because these modes use the same Stokes pulses. The power level of the pump pulses in these modes are not relevant as the pump pulses are blocked in these modes as described herein (only relevant because it impacts the Stokes power but is not incident on the sample). For these modes, the power ratio range may be between 1:41 and 1:1.5.

For the SFG and CARS modes, there are two different power ratios where the responsive signal may be a minimum. This is because these modes are based on a combination of both the pump pulses and Stokes pulses. The lowest signal may be formed from low pump pulses and larger Stokes pulses and vice versa. For example, the power ratio for the lowest signal may be 1:83 or 13:6.1 for SFG. For CARS, the power ratio for the lowest signal may be 1:36 or 16:1.

The values in FIGS. 4A/4B are for descriptive purposes only and the power levels may change based on the oscillator power used. Also as shown in FIGS. 1A and 2, the TFP 104 reflects light with vertical polarization and transmits light with a horizontal polarization. The power ratio for the angles may be reversed in other configurations such as where the pump pulses are transmitted through the TFP 104 and the Stokes pulses reflected.

The TFP 104 is angled with respect to the HWP 102. In an aspect of the disclosure, the angle may be 52 degrees. This angle may have a certain tolerance for variance such as ±1 or 2 degrees.

The transmitted light, e.g., beam containing pulses, may be used for the Stokes pulses. The transmitted light has a horizontal polarization. The polarization may be rotated again using another HWP 106. However, in this case, the HWP 106 may be fixably mounted. The pulses in the beam may be compressed using a pulse compression apparatus 108A (PCF pulse compressor) to shorten the pulses to its nominal value (e.g., pulse fs of the oscillator) (e.g., provides the shortest pulses with the highest peak power). This compensates for dispersion in the optics. In an aspect of the disclosure, the pulse compression apparatus 108A may be a prism pair with a pickoff mirror. However, in other aspects of the disclosure, the pulse compression apparatus 108A may comprise grating pairs or a chirped mirror system.

The reflected light, e.g., beam containing pulses, may be used for the pump pulses. The reflected light has a vertical polarization. The pulses in the beam may be compressed using a pulse compression apparatus 108B (NIR pulse compressor) to shorten the pulses to its nominal value (e.g., pulse fs of the oscillator) (e.g., provides the shortest pulses with the highest peak power). This compensates for dispersion in the optics. The beams may be steered to the compressors 108A/108B via one or more mirrors 101. The compressors may have a prism pair. The pulse compression apparatus 108A/B comprises a prism pair 300. The prisms have opposite orientations. For example, one of the prisms has an upward orientation and another has a downward orientation. The apparatus 108A/B also has a mirror which is tilted (tilted mirror) to reflect the beam from the prism pair back through the same prism pair.

When the beam exits the prism, it is offset vertically from the position it entered. The compressors 108A/108B further comprises the pickoff mirror to redirect the light.

In an aspect of the disclosure, the system 1 may also include the other HWP 106 and a polarizer 110 to optimize the polarization of the Stokes beam, as needed. In another aspect of the disclosure, the HWP 106 after the pulse compression may be rotatable to act as another power regulator. The power regulator for the Stokes beam is optional. In an aspect of the disclosure, the power regulator (HWP 106/polarizer 110) for the Stokes beam may have two positions. One position where the power regulator (HWP 106/polarizer 110) is aligned with the path of the Stokes beam and another where power regulator (HWP 106/polarizer 110) is offset (not aligned). When additional power regulation is needed, the power regulator (HWP 106/polarizer 110) may be moved into alignment with the Stokes beam. The movement may be manual or motorized.

The Stokes beam may be steered or directed towards a photonic crystal fiber (PCF) 114 using one or more mirrors 101 and an objective lens Obj 1 112. The objective lens Obj 1 112 may be moveable to provide optimal focus of the Stokes beam on the PCF 114. The PCF 114 has a small opening and the movement enables the beam to be focused into the opening (and on the PCF 114).

The PCF 114 produces a chirped supercontinuum beam (pulses). In an aspect of the disclosure, the chirped beam is broadband and includes visible light and near-infrared light. A PCF 114 may be selected to provides a wide range of wavelengths in the near-infrared spectra such that, for example, a large number of Raman modes may be examined and obtained. In an aspect of the disclosure, the PCF 114 may produce a spectrum up to 1400 nm. In other aspects, the PCF 114 may generate a supercontinuum up to 1600 nm. For example, one such PCF 114 may be obtained from Newport Corporation and have model number SCG-800-CARS. This PCF is designed to be used with a femtosecond laser with a center wavelength about 800 nm. The objective lens Obj 1 112 may have an NA of 0.4 and a magnification of 20. The objective lens Obj2 112 may have an NA of 0.4 and a magnification of 40. In other aspects, Obj2 112 may have an NA of 0.45. Obj 2 may be moveable to align with the opening at the output end of the PCF 114.

The chirped probe beam may be filtered by a Long Pass Filter 116 (LPF) to remove the visible light from the pulses. In an aspect of the disclosure, the LPF 116 may be an 800-815 nm LPF. The type of LPF may depend on the center wavelength of the oscillator 100. In an aspect of the disclosure, the LPF may be an 810 nm LPF.

Figure 6:
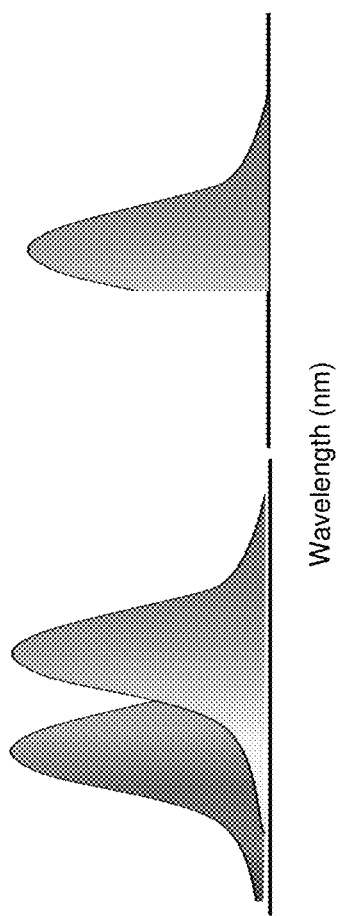
FIG. 6 depicts a representation of a Stokes pulse before and after filtering in accordance with aspects of the disclosure.

FIG. 6 illustrates a representative example of the supercontinuum light output by the PCF 114 (pre-filtering) and a post filtered light output from the LPF 116. As seen in FIG. 6, the output includes the visible light (VIS) and NIR and the VIS is filtered by LPF 116.

In an aspect of the disclosure, the pump beam (pulses) output from the pulse compression apparatus 108B may be steered to a delay 120 via one or more mirrors 101. The delay 120 may be used in one or more nonlinear modes. Additionally and optionally, another HWP 106 and polarizer 110 may be used. The combination of the HWP 106 and polarizer 110 acts as another power regulator such that the power of the pump beam may be reduced, if needed. For example, when the sample may contain cells or certain materials that may be damaged by a pump beam having a high power level, the HWP 106 may be rotated to reduce the power of the pump beam to avoid damage to the sample. In an aspect of the disclosure, the power regulator (HWP 106/polarizer 110) for the pump beam may have two positions. One position where the power regulator (HWP 106/polarizer 110) is aligned with the path of the pump beam and another where power regulator (HWP 106/polarizer 110) is offset (not aligned). When power regulation is needed, the power regulator (HWP 106/polarizer 110) may be moved into alignment with the pump beam. The movement may be manual or motorized.

The delay 120 may be positioned in the path of the pump beam. The delay 120 is configured to change the time in which light pulses in the pump beam arrive at the sample 150/substrate 152. This delay is controllable. In an aspect of the disclosure, the delay 120 may comprise a motorized linear delay stage 325. The motorized linear delay stage 325 may comprise at least two mirrors (reflectors) to steer the light. The mirrors are moveable to lengthen the light path or shorten the light path. The linear delay stage 325 may have a track which enables the mirrors to slide. The linear delay stage 325 may comprise a motor. In an aspect of the disclosure, the motor may be a stepper-motor. A linear delay stage 325 may be obtained from Newport Corporation, Model No. UTM150PP1HL. However, the linear delay stage 325 is not limited to a stepper-motor. For example, the linear delay stage 325 may comprise a DC servo motor.

The delay 120 may further comprises a motor controller 320 and a processor 300. The delay 120 may be used for either CARS mode or SFG mode. The motor controller 320 corresponds to the type of motor in the linear delay stage 325. For example, if a stepper-motor is in the linear delay stage 325, the motor controller 320 may be a stepper-motor controller. The motor controller 320 controls the motor in the linear delay stage 325 based on instructions/commands received from the processor 300.

The delay of the pump beam (pulses) changes the relative timing between the pump beam and the chirped probe beam (Stokes beam). Since the probe beam is chirped, the delay sets which wavelength of the chirped probe beam and the pump pulse overlaps with, at time of arrival on the sample 150/substrate 152. In an aspect of the disclosure, a spectrally broad and temporally chirped Stokes pulse allows for Raman modes spanning ~1000 to ~3500 cm$^{-1}$ to be imaged by simply varying the time delay between the pump and Stokes pulses. The system 1 is not limited to the above range. A spectrally broad and temporally chirped probe pulse (Stokes beam) allows for SFG modes spanning from ~400 nm to ~480 nm to be imaged by simply varying the time delay between the pump and probe pulses.

In an aspect of the disclosure, the relationship between wavenumbers and delay may be determined during a calibration stage using the spectroscopic images. In other aspects, the relationship may be set via a look up table preset in the storage device such as memory.

The delayed pump beam (pulses) may be steered to a bandpass filter 118 (BP1) using one or more mirrors 101.

Figure 7:
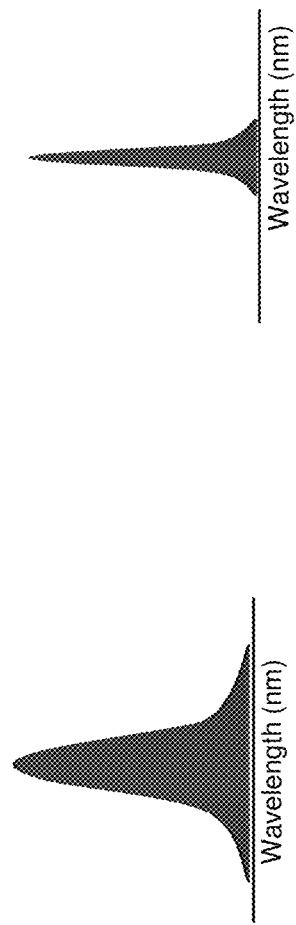
FIG. 7 depicts a representation of a pump pulse before and after filtering in accordance with aspects of the disclosure.

FIG. 7 depicts a representation of an example of a pump pulse, before and after BP1 118.

The system 1 may also comprise another beam block BB2 170. In accordance with aspects of the disclosure, either the pump beam or the chirped probe beam (Stokes beam) may be blocked or neither the pump beam nor the chirped probe beam (Stokes beam) may be blocked depending on a selected nonlinear optical imaging mode(s). For example, the pump beam may be blocked for "Stokes Beam Only 180" imaging modes which includes a SHG(S) (referenced as 193) and TPF(S) (referenced as 194). The chirped probe beam (Stokes beam) may be blocked for "Pump Beam Only 185" images modes which includes SHG(P) (referenced as 195) and TPF(P) (referenced as 196). Neither beams may be blocked when both are used (Pump and Stokes Beams 190) for SFG (referenced as 197) and CARS (referenced as 198).

In an aspect of the disclosure, the beam block BB 170 may comprise two solenoid shutters positioned in the path of the pump beam and the chirped probe beam. The shutters may open to expose the respective beam to a DC 122A or close to block the respective beam from the DC 122A. The beam block BB 170 may be multiple motorized plates configured to move between the respective paths of the beams and away from the respective paths. In other aspects, the same plate may be used to selective block one of the beams. For example, a motorized plate may have at least three positions. A first position where the plate is in the path of the chirped probe beam (Stokes beam) and blocks the same, a second position where the plate is in the path of the pump beam and blocks the same and another position where the plate is in neither beam path nor blocks neither. The position of the motorized plate(s) may be controlled by the processor 300 based on the set mode(s). As shown in FIG. 1A, the beam block BB 2 170 is positioned just before the DC 122A, however, in other aspects of the disclosure, the BB 2 170 may be positioned at other locations downstream of TFP 104.

When neither beam is blocked, the delayed pump beam (pulses) and the chirped probe beam (pulses) are spatially combined using the dichroic mirror 122A (DC1). A dichroic mirror has different reflection/transmission proprieties at different wavelengths. In an aspect of the disclosure, the delayed pump beam may be steered to DC1 122A via one or more mirrors 101. The dichroic mirror DC1 122A may transmit the chirped probe beam (Stokes beam) and reflect the pump beam as shown in FIG. 1A. After DC1 122A, the pump beam and the chirped probe beam may be spatial aligned.

When one of the beams is blocked, there is no combination of the beams or spatial alignment.

In an aspect of the disclosure, one or more beams (unblocked beam(s)) are polarization purified via another polarizer 110. One or more mirrors 101 may be used to steer the light to the polarizer 110. The polarized light beam may be rotated via an achromatic half waveplate 124 to p-polarization. An AHWP is used due to the broadband of the chirped probe beam (when used). A p-polarization is needed for total internal reflection at the substrate-sample interface.

The system 1 may also comprise a beam expander 126A in the path of the unblocked one or more beams (polarized). In an aspect of the disclosure, the beam expander 126A may comprise one or more curved mirrors. The curved mirrors spatially expand the beams. The curved mirrors do not have chromatic aberrations due to the different colors of light being expanded differently (e.g., in the Stokes pulse). When both beams are unblocked, the beam expender 126A provides a spatially expanded beam of the combined pump and chirped probe beam. In an aspect of the disclosure, the spatially expanded beam may be about 1 cm.

In an aspect of the disclosure, the beam expander 126A comprises at least two curved mirrors. The two curved mirrors may expand the beam by at least 2×. In other aspects, the two curved mirrors may expand the beam by at least 4×. The beam expander 126A in combination with the other optics provides the spatially expanded beams which enables obtaining the nonlinear optical imaging in the various imaging modes for a region of interest without having to point scan.

The system 1 also comprises a spatially offset lens 128. This lens 128 is moveable. For example, the lens 128 may be moved in 3-dimensions for focusing and achieving alignment into the objective to satisfy total internal reflection criteria. For example, the movement of the lens 128 in the x and y direction changes the angle of the beam(s) and aligns the beam(s) near an edge of the high NA objective 132 to achieve the total internal reflection at the substrate-sample interface. Movement in the z-direction, changes the illumination area on the sample 150. In an aspect of the disclosure, the lens 128 is positioned to focus the unblocked beams on the back focal plane 132 of a high numerical aperture (NA) objective 132.

Figure 8:
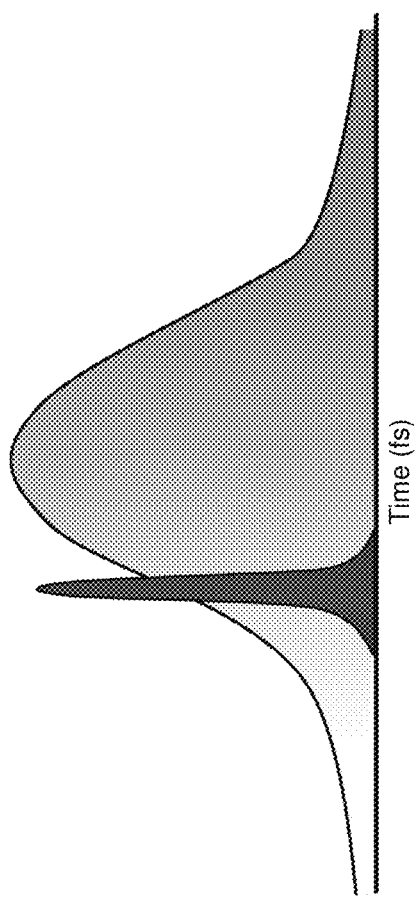
FIG. 8 depicts a representation of a pump pulse and a Stokes pulse at a specific time delay which enter the high NA objective lens in accordance with aspects of the disclosure.
Figure 9:
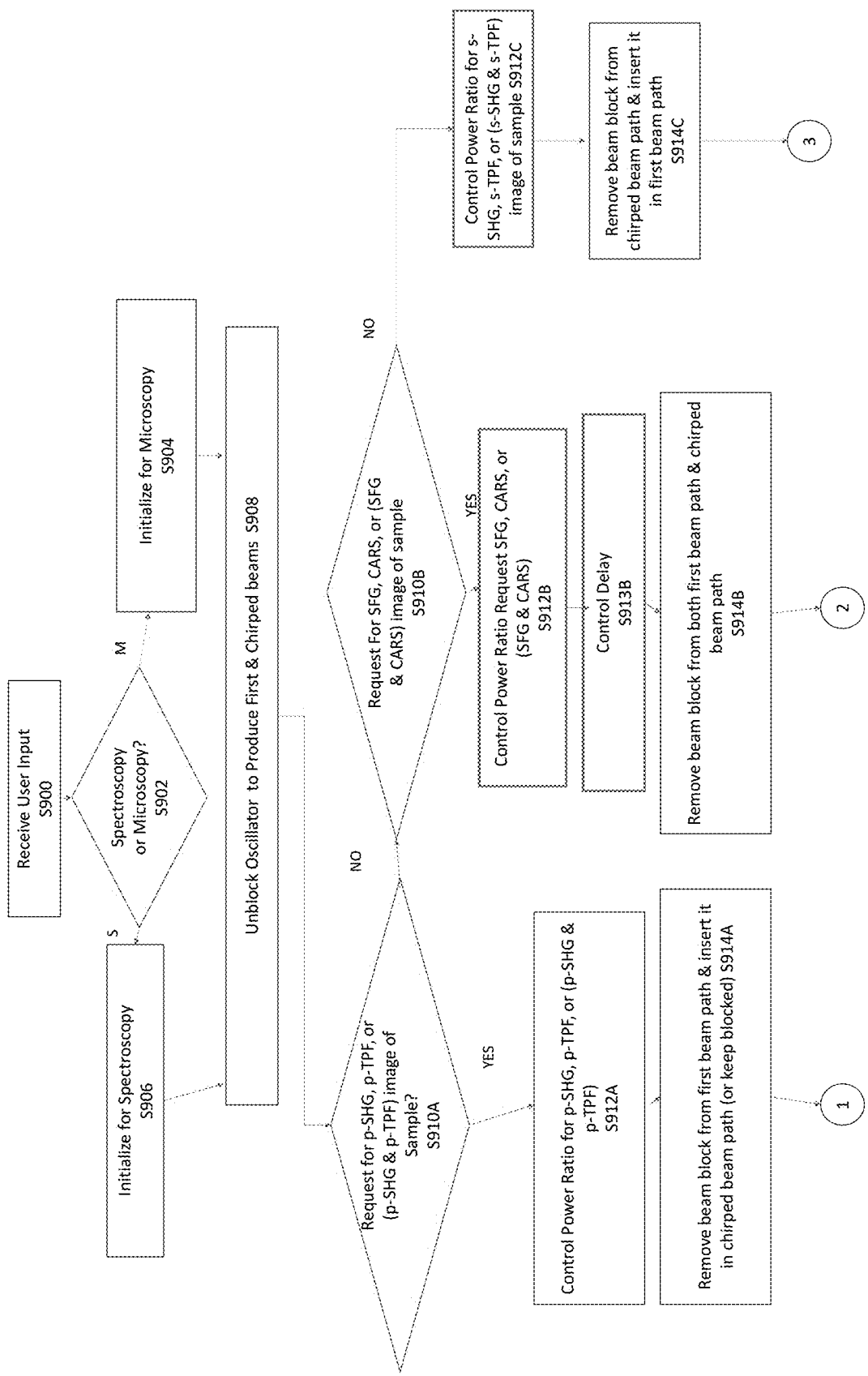
FIGS. 9, 10, 14 and 18 illustrate flow diagrams for controlling the system in accordance with aspects of the disclosure.
Figure 10:
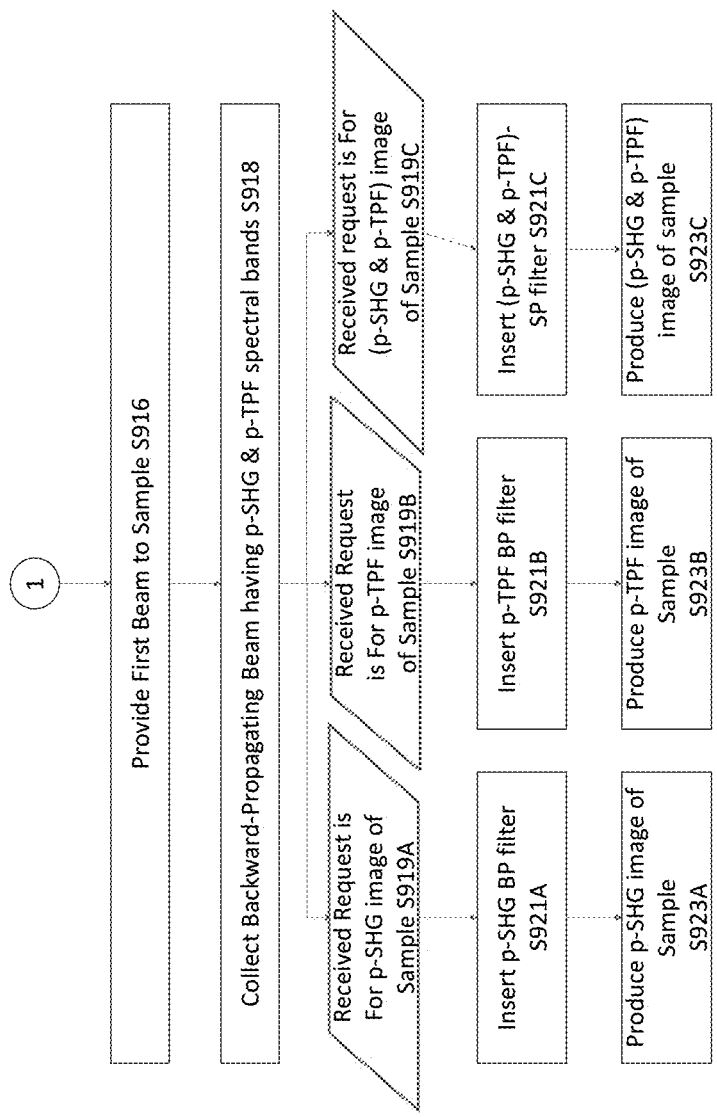

A representation of a pulse of the combined pump and chirped probe beam (Stokes) is shown in FIG. 8 for a specific time delay $t_n$ (when both are unblocked).

The system 1 also comprises another dichroic mirror 122B (DC2). DC2 122B reflects the unblocked beams (either the pump beam or chirped probe beam or both). The DC2 122B is transmissive of the responsive light emitted by the sample 150. In an aspect of the disclosure, the cutoff for DC2 122B may be 725 nm.

Figure 5:
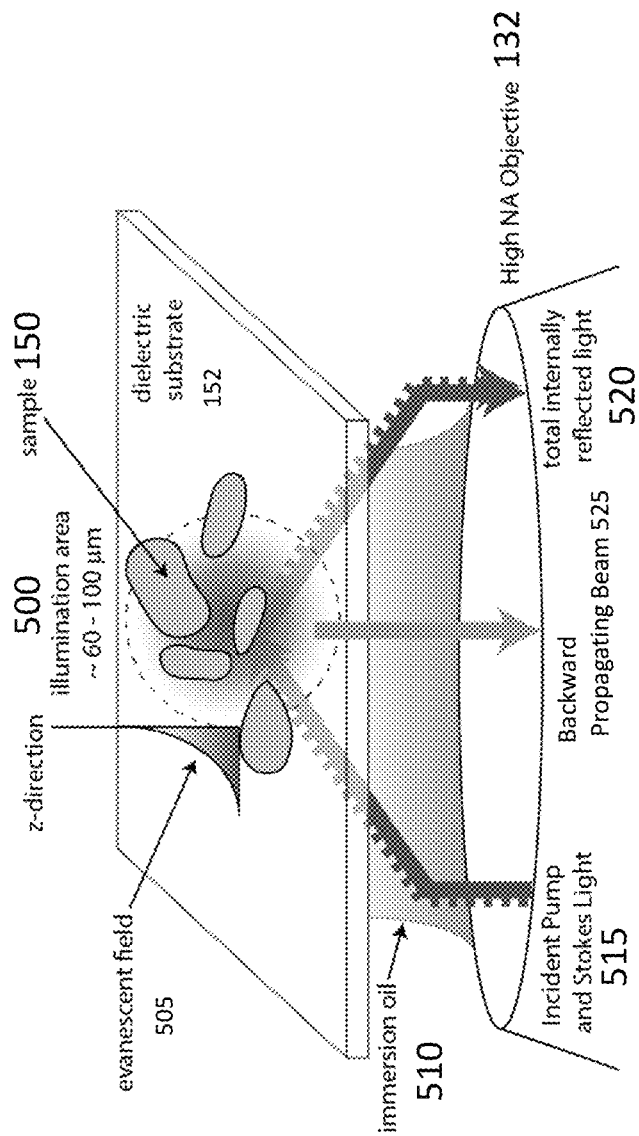
FIG. 5 depicts a dielectric substrate with a sample and respective light in accordance with aspects of the disclosure.

The objective 132 may be an oil immersion lens. The immersion oil 510 is shown in FIG. 5. The objective 132 may have a high NA. For example, the NA may be above 1.4. In an aspect of the disclosure, the NA may be 1.49. The objective 132 may have a magnification of 60×. In other aspects, the magnification may be 100×.

The objective 132 is configured to cause total internal reflection at the substrate-sample interface. For example, the objective may be obtained from Nikon® 1.49 NA, Apo 100× (TIRF). Due to the high numerical aperture, the objective 132 enables a relatively shallow evanescent field 505 to be emitted near the sample/substrate interface. The TIR in the substrate 152 causes the evanescent field 505. The evanescent field 505 is shown in FIG. 5. A representative of the field strength as a function of the z-direction is shown in FIG. 5. The magnitude of the evanescent field 505 decreases the further into the sample 150 (as the distance from the substrate 152 increases). In an aspect of the disclosure, the objective 132 enables the evanescent field 505 to penetrate into the sample 150 less than about 250 nm allowing for selective illumination of a small region in the z-direction. For example, the high NA objective 132 enhances surface sensitivity by confining the evanescent field 505 near the sample/substrate interface. This allows for imaging thin samples or species near interfaces. Confining the evanescent field 505 eliminates bulk and background responsive emissions from species away from the sample/substrate interface.

In FIG. 5, both pump and Stokes light (beams 515) are shown for illustrative purposes, however, as described above one of the pump and Stokes beams may be blocked. Thus, in FIG. 5, unblocked beams may be incident on the sample 150.

The dielectric substrate 152 may be made of glass. In other aspects, the substrate 152 may be made of Quartz. Additional substrates may be used. However, the additional substrates would have to match the index of refraction of the immersion oil. The dielectric substrate 152 is transparent to the incident pump and chirped probe beams (identified in FIG. 5 as 515) and the backwards propagating beam 525 (responsive light). Due to the dielectric substrate 152 being transparent to both incident pump and chirped probe beams 515 and the backwards propagating beam 525, the imaging CCD 142 may be on the same side of the sample as the incident beams. Advantageously, this allows for imaging of samples which may be opaque and thick which may not be properly imaged if the imaging CCD was on the opposite side of the incident beams. Additionally, the same objective 132 is used for both focusing the incident pump and chirped probe beams 515 (unblocked beams) and imaging of the backwards propagating beam 525. Thus, an additional objective is not required. The backwards propagating beam 525 may be the SHG(S) 193, TPF(S) 194, SHG(P) 195, TPF(P) 196, SFG 197 and/or CARS 198 depending on the selected mode or combinations of modes.

Further, the use of dielectric substrate 152, such as a conventional glass coverslip, makes it compatible with existing technologies. In an aspect of the disclosure, the index of refraction on the sample side is smaller than that index of refraction of the dielectric substrate 152. This enables TIR in the dielectric substrate 152.

The system 1 has an illumination area 500 of about 60 µm to about 100 µm (x and y axes). In other aspects of the disclosure, the illumination area 500 may be smaller.

The TIR light 520 exits the dielectric substrate 152. A portion of the TIR light 520 which exits the dielectric substrate 152 is transmitted back through the objective 132. To prevent this light 520 from propagating in the reverse direction to the optics including the PCF, the system 1 also comprises a beam block 134. The beam block 134 may be a side of a lens or a mirror mount. For example, the side of lens mount 128 may be used as the beam block.

The evanescent field 505 near the sample/substrate interface causes emission of responsive light by constituent materials in the sample 150, e.g., SHG(S) 193, TPF(S) 194, SHG(P) 195, TPF(P) 196, SFG 197 and/or CARS 198 depending on the selected mode or combinations of modes.

The system 1 may also comprise another beam expander 126B. This beam expander 126B may be optional. Beam expander 126B decouples the size of the illumination area 500 with the size of the imaging area as seen on an imaging CCD 142. The beam expander 126B may have different positions such as a first position offset from the backwards propagating beam 525 path to the imaging CCD 142 and a second position aligned with the backwards propagating beam 525 path to the imaging CCD 142. The beam expander 126B may be manually moved between the first position and the second position (as needed). In an aspect of the disclosure, the beam expander 126B may comprise lenses such as two lenses. The two lenses may expand the beam by at least 4×. In other aspects, the two lenses may expand the beam by at least 2×.

The beam expander 126B may be used for different imaging sizes. For example, when the beam expander 126B is at the first position, the image size is the same as the illumination area 500. However, there may be a desire to see only a portion of the illumination area 500 such as a central portion. The beam expander may be used to focus the image size to a target region. For example, the image size may be about 20 µm×20 µm to about 80 µm×80 µm. 20 µm×20 µm may correspond to when a 4× beam expander 126B is used. 80 µm×80 µm may correspond to when no beam expander is used (maximum for the setup based on the optics including the tube lens, however another maximum may be used). 40 µm×40 µm may correspond to when a 2× beam expander 126B is used.

In other aspects, more than one beam expander 126B may be used. For example, one beam expander 126B having a 2× expansion may be used and another beam expander 126B having a 4× expansion may be used. Each may have the first and second positions such that the image size may be set as needed.

The system may also comprise a short pass filter SP 140 be positioned between the DC 2 122B and the imaging CCD 142. The filter may have a similar cutoff as the DC2 122B. For example, the SPFs may have a cutoff around 750 nm. The SP 140 may be obtained from Semrock®, Inc., Model no. FF750-SDi002. The filter increases the percent of the unwanted light being rejected. The filters 140 and DC2 122B are not ideal and thus a certain amount of unwanted light is not rejected. Additional filters may increase the rejected amount.

In accordance with aspects of the disclosure, since there are different nonlinear imaging modes and each mode may have a responsive signal in different wavelengths, mode specific filters 141 may be positioned in the path of the backwards propagating beam 525. The mode specific filters enable the selective production of a mode specific image. In an aspect of the disclosure, the mode specific filters may be a filter wheel. A filter wheel may have multiple different filters. For example, a 6-filter wheel may be used. The filters in the filter wheel may be based on the wavelength of the oscillator 100. For example, when the oscillator 100 has a wavelength centered at 809 nm, which in turn will provide a pump beam having the same center wavelength (809 nm), in SHG (P) 195, the SHG (P) may have data at 404.5 nm. Thus, the BP 141A (filter in a filter wheel) may have a range of 400 nm to 410 nm. In SHG(S) 193, when the Stokes beam is centered at 1000 nm, the SHG (S) may have data at 500 nm. Thus, the BP 141E (filter in a filter wheel) may have a range of 475 nm to 525 nm. For a SFG mode, where the Stokes beam is centered at 1000 nm and the pump beam is centered at 809 nm, the SFG may have data at 450 nm. Thus, the BP 141C (filter in a filter wheel) may have a range of 415 nm to 495 nm. However, the range may depend on the delay. For a CARS mode, where the Stokes beam is centered at 1000 nm and the pump beam is centered at 809 nm, the CARS may have data at 670 nm. Thus, the BP 141D (filter in a filter wheel) may have a range of 600 nm to 725 nm. However, the range may depend on the delay. For TPF both (P) and (S), the filter may depend on the sample of interest. In an aspect of the disclosure, one of the slots in the filter wheel may be empty and equates to no filtering. In an aspect of the disclosure, the rotation of the filter wheel may be controlled by the processor 300. In other aspects, the filter wheel may be manually rotated.

In other aspects of the disclosure, instead of a filter wheel, a plurality of independently moveable filters may be used, and the position thereof separately controlled between in the path and offset from the path.

The system 1 may comprise one or more additional mirrors 101 to steer the backwards propagating beam 525 to the imaging CCD 142. The system 1 also comprises a tube lens (not shown in FIG. 1A). The tube lens produces an intermediate image. The tube lens is within a tube body between the high NA objective 132 and an eyepiece of the microscope (or the imaging CCD 142). The intermediate image enables the formation of an image in a desired location.

The imaging CCD 142 (camera) may be of any size such as, but not limited to, 1024×1024 pixels. The imaging CCD 142 may be obtained from Teledyne Princeton Instruments. An example of a nonlinear optical image 144 (signal) from a combination of modes is shown in FIG. 1A.

The system 1 may include additional optics such as mirrors for steering, which are not shown in FIG. 1A as needed.

In other aspects of the disclosure, multiple filter wheels and imaging CCD 142 may be used when multiple different separate images (mode specific) may be desired.

The system 1 may also comprise components for spectroscopic imaging (an example of a spectroscopic image 192 is shown in FIG. 1A). These components may also be used for calibration to define a relationship between the time delays and CARS light. In other words, the spectral measurement during calibration serves to calibrate the peak Raman shift with the time delay.

The measured radiated light in the forward direction may be collected via an objective 2005. This objective 2005 is moveable as needed to focus the forward radiated light toward a parabolic reflector 2015. In an aspect of the disclosure, the objective 2005 is manually moveable. However, in other aspects of the disclosure, the objective 2005 may be motorized.

The forward radiated light may be filtered by one or more filters 2010. The filters may be short pass filters. The short pass filter may be about 800 nm. In other aspects, the short pass filter may be about 785 nm. One such short pass filter may be obtained from Semrock®, Inc., Model no. BSP01-785R-25. In an aspect of the disclosure, a second short pass filter may be used. This short pass filter may have a cutoff of 750 nm. In an aspect of the disclosure, this filter may be acquired from Edmund Optics® Inc., and be Part no. 64-322. Two filters are used because of the amount of signal for measurement is weaker than the incident beam(s) and a single filter may not be sufficient to achieve the filtering of the incident beams. This is to prevent the incident beams from dominating the signal for measurement.

The filtered forward radiated light is collected and focused by a parabolic reflector 2015. The parabolic reflector 2015 couples the light into the fiber optic 2020. The fiber optic 2020 is connected to a spectrometer 2025 (spectrograph and a CCD camera). The spectrograph may comprise a grating. A 300 lines per mm grating may be used. In other aspects, a 600 line per mm grating may be used. The line rate may be chosen depending on a spectral range probed. The grating may be configured with a central wavelength of 700 nm. In other words, a wavelength of 700 nm may be directed to the center of a CCD camera. The grating may disperse wavelengths. The spectrograph also may comprise mirrors (such as two mirrors) that focus the light onto the grating and other to the CCD camera.

Figure 1B:
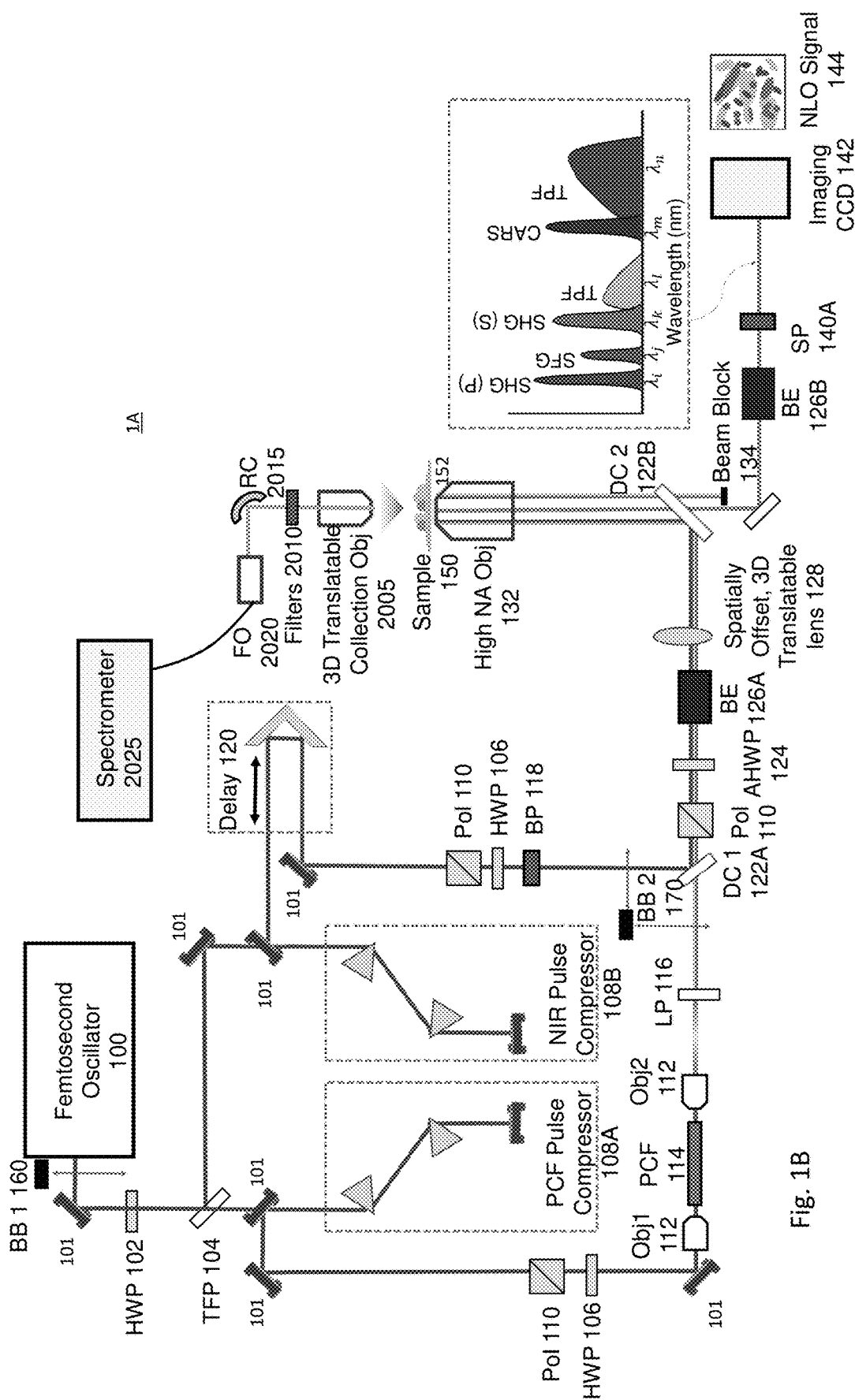
FIG. 1B illustrates another multimodal nonlinear optical imaging system and spectroscopy system in accordance with other aspects of the disclosure.

FIG. 1B illustrates another multimodal nonlinear optical imaging system and spectroscopy system 1A in accordance with other aspects of the disclosure. The difference in the system 1 in FIG. 1A and the system 1A in FIG. 1B is that the mode specific filters 141 are omitted. The same SP filter may be used or a different SP filter 140A may be used. The different filter may be a SP filter having a cut on wavelength of about 725 nm. System 1A may be used when there is a dominant signal from a specific imaging mode. For example, when neither beam is blocked, responsive signals from all of the modes may be seen in the image. However, if there is a dominant signal from a specific image mode, responsive signals from the other modes may be ignored (not strong) and the image would effectively represent the responsive signal from the dominant mode. Thus, the selection of the system 1, 1A may be based on apriori knowledge of the sample.

Figure 3:
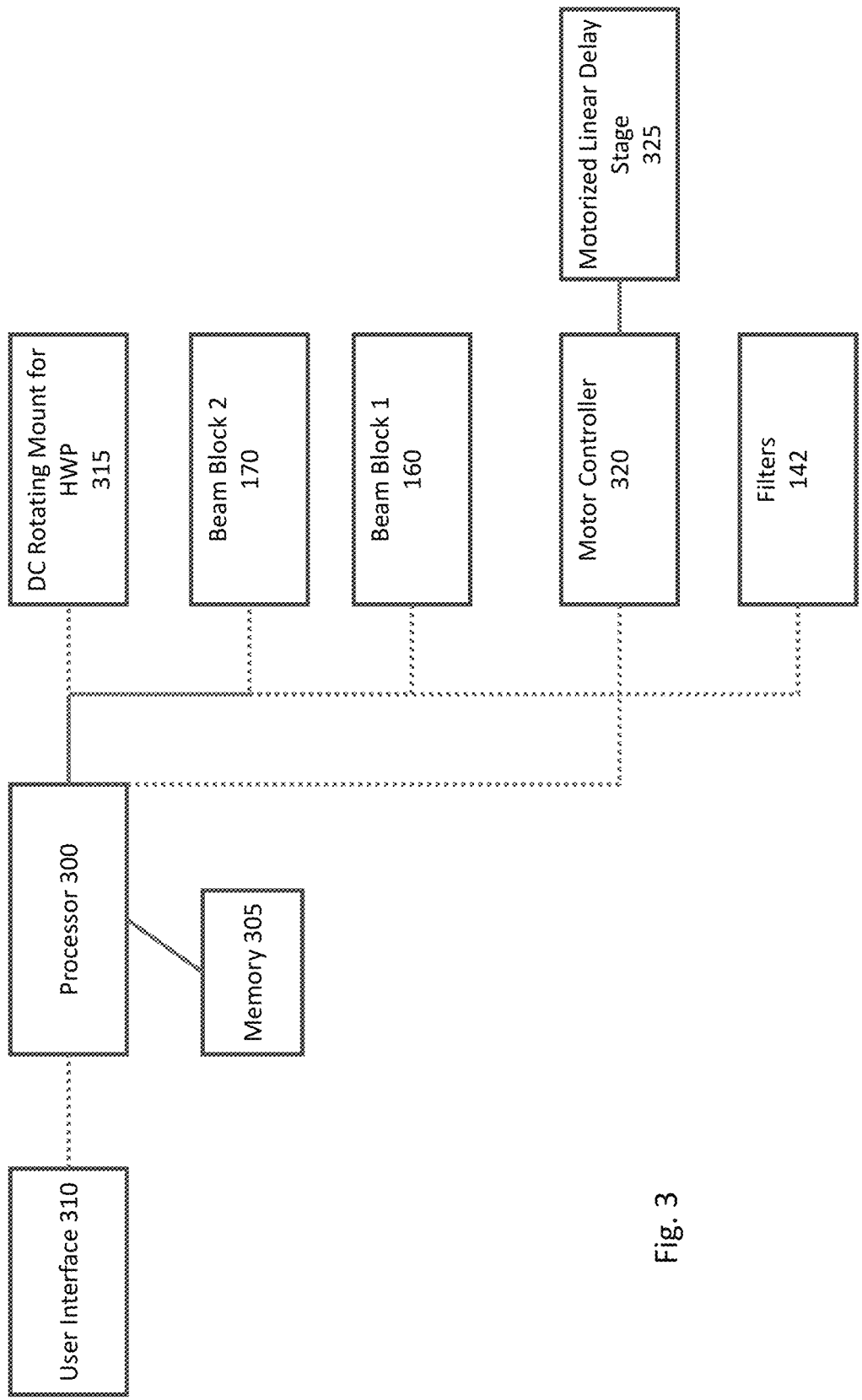
FIG. 3 illustrates a block diagram of control systems for the different nonlinear optical imaging modes in accordance with aspects of the disclosure.

In accordance with aspects of the disclosure, the pump/Stokes beam power, the filter 141 and the beam block 170 may be controlled in accordance with the setting of a nonlinear imaging mode(s). FIG. 3 illustrates a block diagram of such control. The control may comprise a processor 300, a memory 305 and a user interface 310. The processor 300 may be one or more CPUs. In other aspects of the disclosure, the processor 300 may be a microcontroller or microprocessor or any other processing hardware such as an FPGA. In an aspect of the disclosure, the processor 300 may be configured to execute one or more programs stored in a computer readable storage device (such as memory 305). The memory 305 can be RAM, persistent storage, or removable storage. A storage device is any piece of hardware that is capable of storing information, such as, for example without limitation, data, programs, instructions, program code, and/or other suitable information, either on a temporary basis and/or a permanent basis.

The user may set an imaging mode (spectroscopy and/or microscopy) (SHG(S) 193, TPF(S) 194, SHG(P) 195, TPF(P) 196, SFG 197 and/or CARS 198) and other control information (such as a specific wavenumber (CARS) and identified the sample (which may be used to determine power within the mode specific range) using the user interface 310. In an aspect of the disclosure, the user interface 310 may be in the same device as the processor 300. For example, the user interface 310 and processor 300 may be incorporated in a personal computer or laptop and the control program installed on the same. In other aspects of the disclosure, the user interface 310 may be located at a mobile terminal such as a mobile telephone or a tablet and the input is via an application in the device. For example, the user interface 310 may be a touchscreen on the mobile telephone or tablet. The control information may be transmitted to the processor 300 via a wireless or wired network. In some aspects, the wireless network may be a Local Area Network or cellular network. In other aspects, the user interface 310 may be a keypad. In some aspects, the user interface 310 may appear on a screen in the form of a graphical user interface (GUI). The GUI may include menus or screens to select the different modes. For example, there may be a screen for selecting spectroscopy and/or microscopy. The same or a different screen may be used to select one or more nonlinear optical imaging modes SHG(S) 193, TPF(S) 194, SHG(P) 195, TPF(P) 196, SFG 197 and/or CARS 198. In response to the receipt of a mode, a mode specific screen may appear. The mode specific screen may be a pop up window superposed on the mode selection screen. The mode specific screen may comprise different information based on the selected mode. For example, for CARS, the mode specific screen may include a wavenumber(s) of interest. The mode specific screen may also include a request to identify the sample or indicate a power level.

The memory 305 may store the rotation angle information for rotating the mount for the HWP 102 (DC rotating mount 315). The rotation angle information may be in the form of one or more tables of allowable rotation angles for the different modes. In an aspect of the disclosure, there may be a different table for the different modes, respectively. In other aspects, one table may be included for all of the modes. In some aspects of the disclosure, the table may include additional information such as the allowable range (within the lowest and highest range for the mode) for different samples.

The memory 305 may also store the calibration information related to the delay 120 and the wavenumber. In other aspects, the memory 305 may also store a rotation angle for the filter wheel for mode specific filtering (filters 141) or a relationship between the mode and a specific filter.

FIGS. 9, 10, 14 and 18 illustrate an example of an imaging process in accordance with aspects of the disclosure. The process begins with the receipt of user input (S900) at the processor 300 via the user interface 310. As described above, the input may be received using one or more screens. The input may include the imaging type spectroscopy and/or microscopy and the modes SHG(S) 193, TPF(S) 194, SHG(P) 195, TPF(P) 196, SFG 197 and/or CARS 198 and mode specific instructions. At S902, the processor 300 determines which type of imaging is set based on the received user input. In some aspects of the disclosure, both may be set. When microscopy is set, the processor 300 proceeds to S904 and initializes the system for microscopy. When spectroscopy is set, the processor 300 proceeds to S906 and initializes the system for spectroscopy. Initialization of microscopy/spectroscopy may include supplying required power to either the imaging CCD 142 (microscopy) or the spectrometer 202S (spectroscopy), loading the corresponding USB or network address for the CCD 142 or spectrometer 202S, identifying the port, defining the number of pixels or bins for the image. Additionally, the initialization may include starting any cooling needed for the operation of the respective devices. When both are set (not shown), both are initialized. Afterwards, the processor 300 causes the oscillator 100 to be unblocked. In aspect of the disclosure, the processor 300 may cause a screen or prompt to be displayed on the user interface 310 to move the beam block 160. In other aspects, the processor 300 may automatically move the beam block 160 or actuate the solenoid shutter, if used.

At S910(A/B), the processor 300 determines what nonlinear optical imaging mode(s) is set. For example, at S910 the processor determines whether the SHG(P) 195 or TPF(P) 196 and combination SHG(P) 195 and TPF(P) 196 is set (requested). For purposes of the description, p-SHG is the same as SHG(P) and TPF(P) is the same as p-TPF. When it is determined that either of SHG(P) 195 or TPF(P) 196 is set or a combination thereof is set ("Y" at S910A), the process moves to S912A. At S912A, the processor 300 determines the appropriate power ratio (level for the pump and Stokes beams). The processor 300 may determine the ratio based on any mode specific instructions received at S900. The processor 300 may also retrieve the allowable range for the ratio stored in memory 305 and set the power ratio based on the allowable range in combination with any mode specific instructions (allowable rotation angles). In an aspect of the disclosure, absence any mode specific instructions, the processor 300 may default to the highest signal for the specific mode (rotation angle that produces the same). For example, for SHG(P) 195 or TPF(P) 196, the highest ratio is 43:1. The processor 300 may also retrieve from memory 305 the information regarding the specific rotation angles to achieve that ratio, the rotation angle of the HWP 102 may be around 336 degrees. Once the rotation angle is determined, the processor 300 may control the DC rotating mount 315 to the determined rotation angle.

At S914A, the processor 300 may control the beam block 170 to selectively block the chirped beam path (Stokes beam) and not block the pump beam path. In an aspect of the disclosure, when the system 1/1A is initially turned ON, both beam paths may be blocked. For example, solenoid shutters in the paths may be controlled to be closed. In this aspect, the processor 300 may control the solenoid shutter in the path of the pump beam to open, to allow the pump beam to pass while keeping the solenoid shutter in the path of the chirped beam to remain closed. When a single block is used, the processor 300 may cause the block to move positions to only block the chirped beam (Stokes beam), e.g., block the path for the chirped beam. At S916, the pump beam (first beam) is provided to the sample via the disclosed optics. Since SHG(P) 195 or TPF(P) 196 is set or a combination thereof is set at S918, a backwards propagating beam 525 having both p-SHG and p-TPF spectral bands is collected back through the objective 132 and optionally expanded by BE 126B (and filtered by SP 140).

Figure 11:
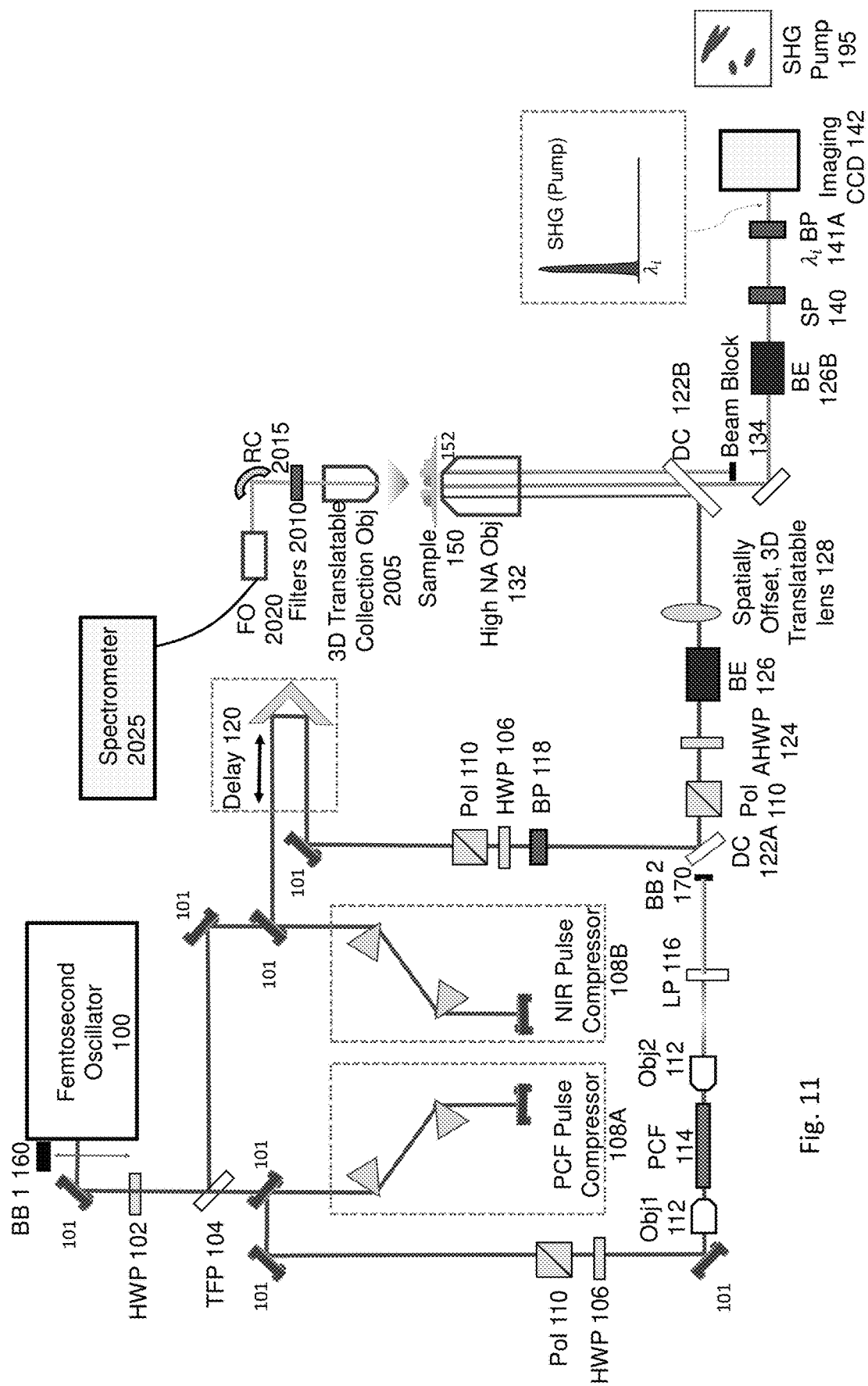
FIG. 11 illustrates an example of a configuration for the system in SHG (pump) mode and an example image in accordance with aspects of the disclosure.

If the mode selected is only for p-SHG image 195 (S919A), the processor 300 may cause a mode specific filter for the p-SHG mode (filter 141A) to be inserted in the backwards propagating beam 525 path (before the CCD 142) at S921A. Operating the mode specific filter may be omitted if spectroscopy is set. In an aspect of the disclosure, the processor 300 may retrieve the rotation angle for the filter wheel for the mode specific filter 141A associated with the set mode. For example, the mode specific filter may be a band pass filter for a specific spectral band for the p-SHG mode. The processor 300 may cause the filter wheel to rotate to the specific angle (stored in memory 305). In some aspects of the disclosure, S921A may be omitted when system 1A is used and there is a dominant mode. At S923A, an p-SHG image 195 of the sample 150 is produced at the CCD 142. FIG. 11 illustrates an example configuration of the system 1 when the p-SHG mode is set. As shown in FIG. 11, the BB 2 170 is positioned in the path of the chirped beam (Stokes beam) and blocked. $\lambda_i$ bandpass filter 141A is inserted after SP 140 and before CCD 142 in the backwards propagating beam path. FIG. 11 also shows an example of an p-SHG image 195 and spectral range $\lambda_i$.

Figure 12:
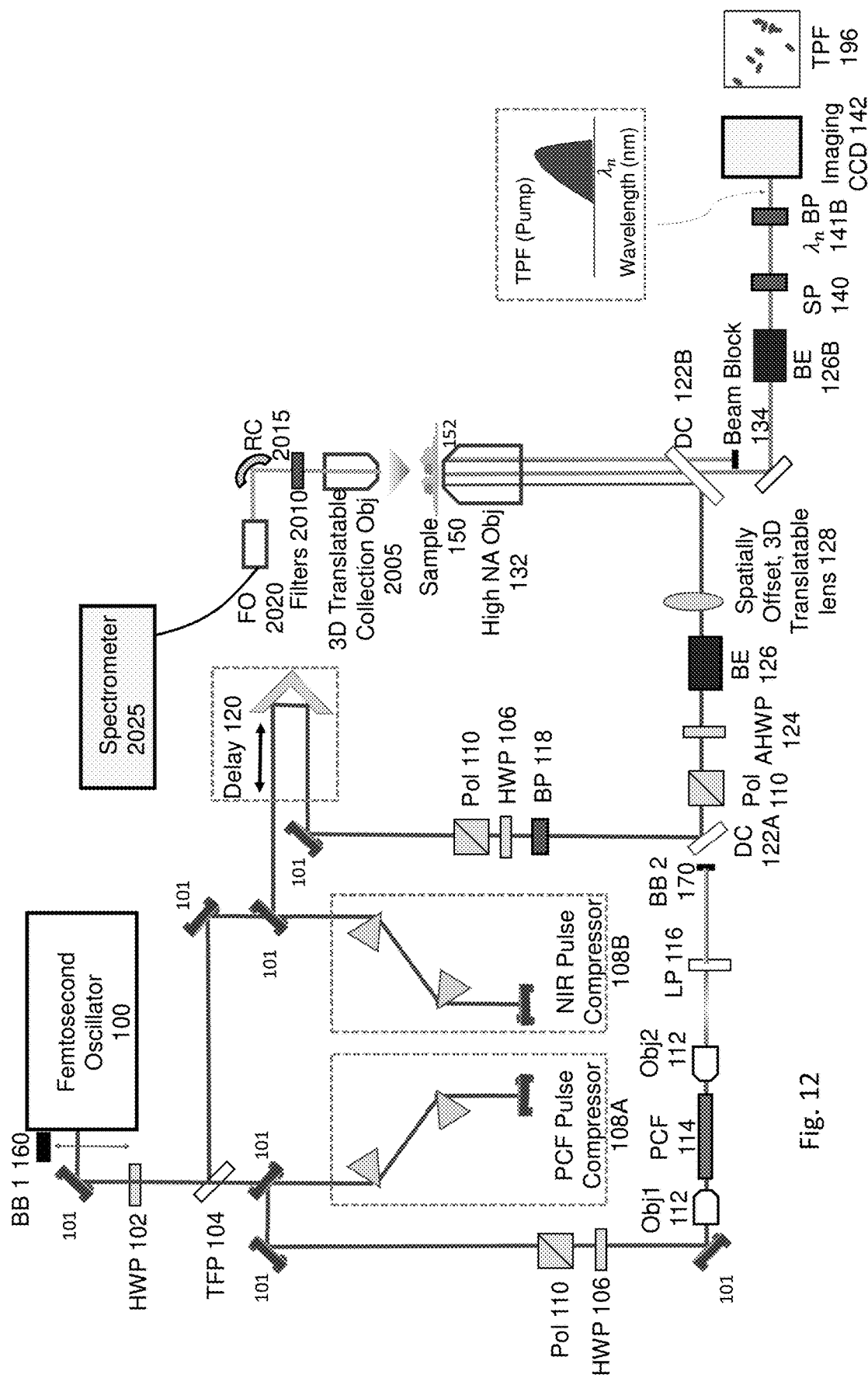
FIG. 12 illustrates an example of a configuration for the system in TPF (pump) mode and an example image in accordance with aspects of the disclosure.

If the mode selected is only for p-TPF image 196 (S919B), the processor 300 may cause a mode specific filter for the p-TPF mode (filter 141B) to be inserted in the backwards propagating beam 525 path (before the CCD 142) at S921B. In an aspect of the disclosure, the processor 300 may retrieve the rotation angle for the filter wheel for the mode specific filter 141B associated with the set mode. For example, the mode specific filter may be a band pass filter for a specific spectral band for the p-TPF mode. The processor 300 may cause the filter wheel to rotate to the specific angle (stored in memory 305). In some aspects of the disclosure, S921B may be omitted when system 1A is used and there is a dominant mode. At S923B, an p-SHG image 196 of the sample 150 is produced at the CCD 142. FIG. 12 illustrates an example configuration of the system 1 when the p-TPF mode is set. As shown in FIG. 12, the BB 2 170 is positioned in the path of the chirped beam (Stokes beam) and blocked. A $\lambda_n$ bandpass filter 141B is inserted after SP 140 and before CCD 142 in the backwards propagating beam path. FIG. 12 also shows an example of an p-TPF image 196 and spectral range $\lambda_n$.

Figure 13:
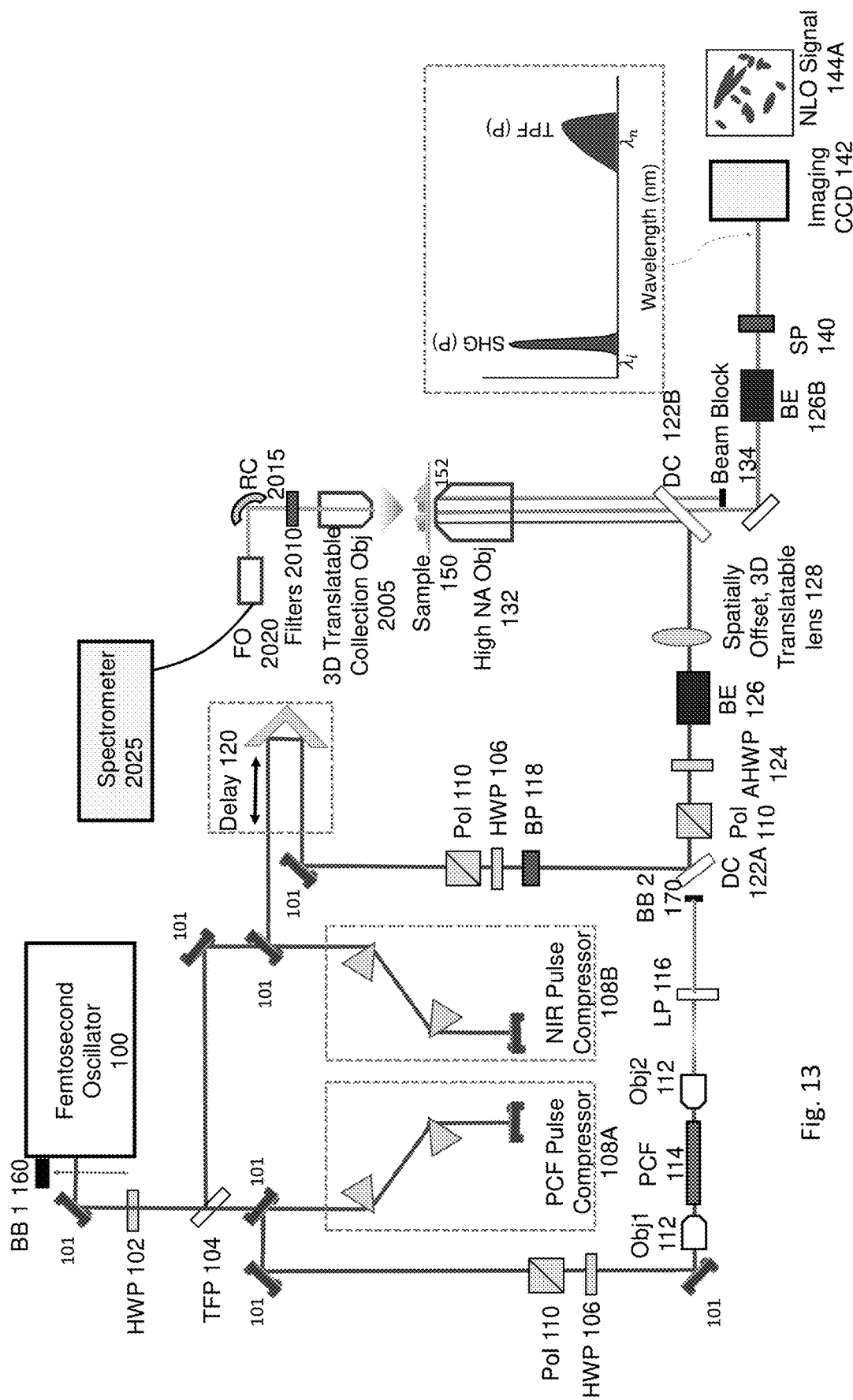
FIG. 13 illustrates an example of a configuration for the system in TPF (pump) mode and SHG (pump) mode and an example image in accordance with aspects of the disclosure.

If the mode selected is for both a p-SHG image 195 and p-TPF image 196 (S919C), filter for both modes, e.g., both spectral bands may be used. In some aspects of the disclosure, the same SP filter 140 may be used given the spectral ranges $\lambda_i$ and $\lambda_n$. In this aspect of the disclosure, the processor 300 may control the filter wheel such that an empty slot in the filter wheel is in the path of the backwards propagating beam 525 path (before the CCD 142) at S921C. In an aspect of the disclosure, the processor 300 may retrieve the rotation angle for the filter wheel for the empty slot. At S923C, a combination image having the p-SHG image 195 and p-TPF image 196 of the sample 150 is produced at the CCD 142. FIG. 13 illustrates an example configuration of the system 1 when the p-SHG image 195 and p-TPF image 196 is requested. As shown in FIG. 13, the BB 2 170 is positioned in the path of the chirped beam (Stokes beam) and blocked. FIG. 13 also shows an example of a combination image having the p-SHG image 195 and p-TPF image 196 (combination 144A) and combined spectral range $\lambda_i$ and $\lambda_n$. In FIG. 13, no mode specific filter 141 is shown (which is the same as having the filter wheel in an empty slot).

When it is determined that either of SHG(P) 195 or TPF(P) 196 is not set or a combination thereof is not set ("N" at S910A), the process moves to S910B to determine whether SFG 197, CARS 198 or a combination thereof is set. Once again, this determination is based on the input received at S900. When it is determined that either of SFG 197, or CARS 198 is set or a combination thereof is set ("Y" at S910B), the process moves to S912B. At S912B, the processor 300 determines the appropriate power ratio (level for the pump and Stokes beams). The processor 300 may determine the ratio based on any mode specific instructions received at S900. Here since the power ratio is different for SFG 197 or CARS 198, at S912B, the processor 300 may determine the specific mode. The processor 300 may also retrieve the allowable range for the ratio stored in memory 305 and set the power ratio based on the allowable range for the mode with any mode specific instructions (allowable rotation angles). In an aspect of the disclosure, absence any mode specific instructions, the processor 300 may default to the highest signal for the specific mode (rotation angle that produces the same). For example, for SFG 197, the highest ratio may be 1:2 and for CARS, the highest ratio may be 4:1. The processor 300 may also retrieve from memory 305 the information regarding the specific rotation angles to achieve that ratio. Once the rotation angle is determined, the processor 300 may control the DC rotating mount 315 to the determined rotation angle.

At S913B, the processor 300 based on the mode specific instructions, may control the delay 120 to a set to a specific delay based on a received wavenumber. For example, the processor 300 may retrieve the calibration information from memory 305 having a relationship between delay and the wavenumber and set the delay for the input wavenumber received at S900. The processor 300 may control the motor controller 320 to move the motorized linear delay stage 325 to achieve the target delay for the input wavenumber.

At S914B, the processor 300 may control the beam block 170 to unblock both chirped beam path (Stokes beam) and the pump beam path. In an aspect of the disclosure, when the system 1/1A is initially turned ON, both beam paths may be blocked. For example, solenoid shutters in the paths may be controlled to be closed. In this aspect, the processor 300 may control the solenoid shutter in the paths of the chirped beam and pump beam to open, to allow the chirped beam and pump beam to pass. When a single block is used, the processor 300 may cause the block to move positions to be away from both paths. When two motorized blocks are used, the processor 300 may cause both blocks to move the positions away from the respective paths.

Figure 14:
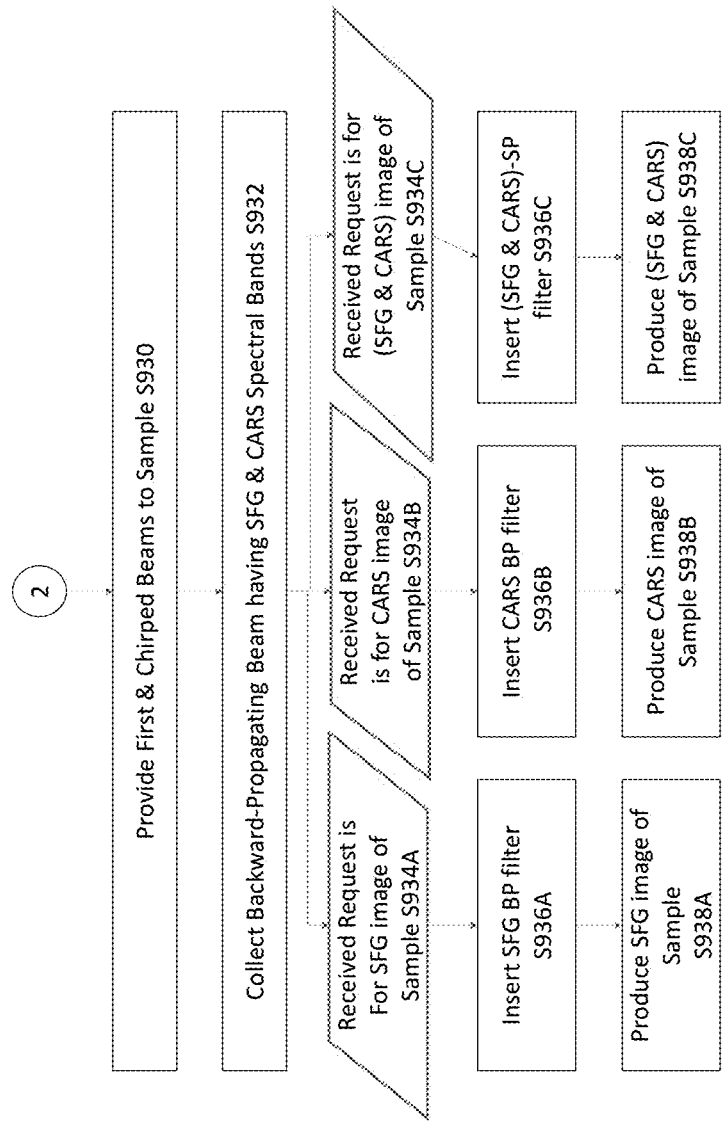

At S930 (as shown in FIG. 14), the pump beam (first beam) and the chirped beam (Stokes Beam) are both provided to the sample 150 via the disclosed optics since both paths are unblocked. Image data from all modes may be collected at S932 (however for illustrative purposes at S932 only SFG and CARS spectral bands are shown in FIG. 14). For example, the spectral range for SHG(S) 193, TPF(S) 194, SHG(P) 195, TPF(P) 196, SFG 197 and CARS 198 are obtained as responsive signals in the backwards propagating beam 525.

Figure 15:
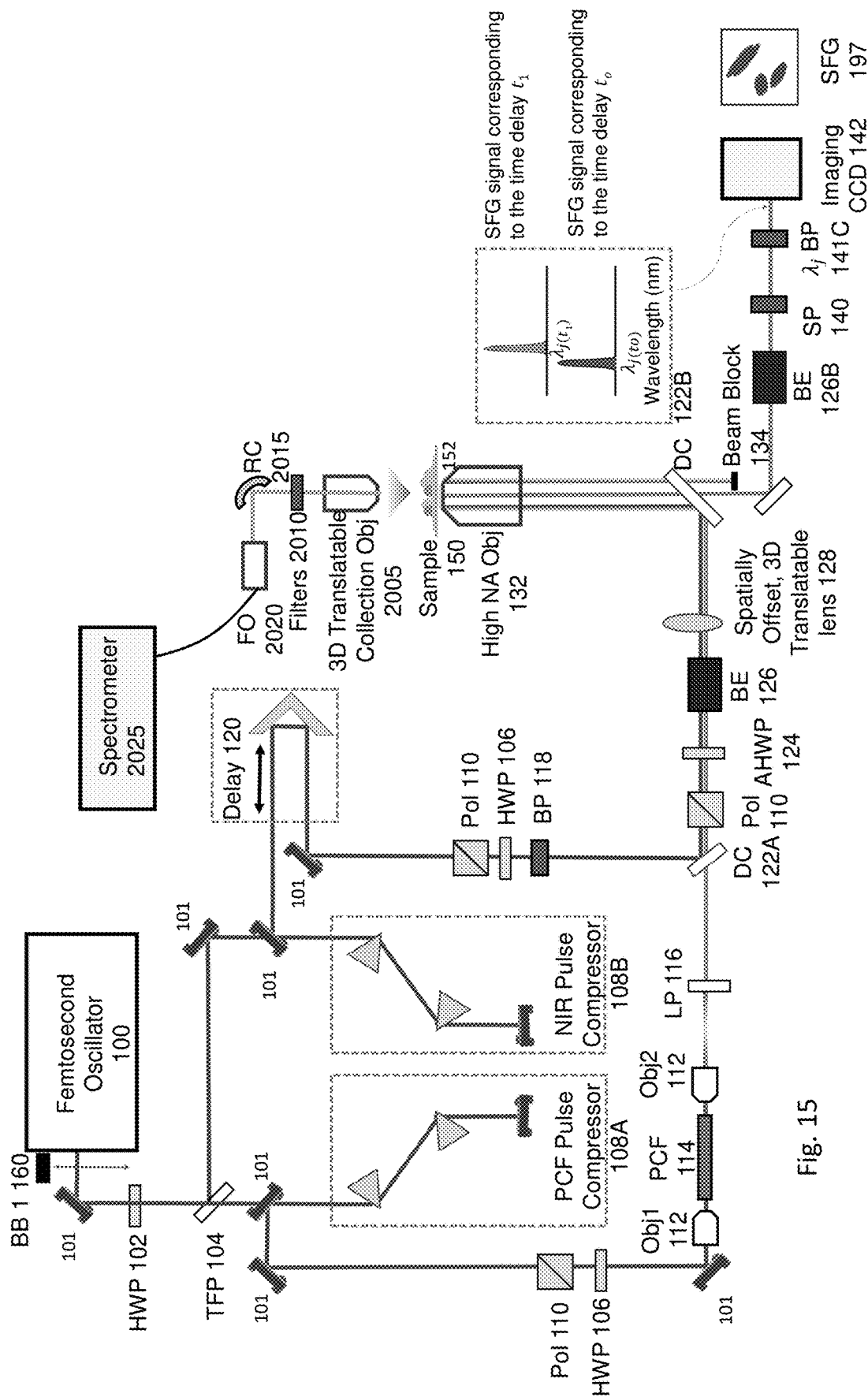
FIG. 15 illustrates an example of a configuration for the system in SFG mode and an example image in accordance with aspects of the disclosure.

If the mode selected is only for SFG image 197 (S934A), the processor 300 may cause a mode specific filter for the SFG mode (filter 141C) to be inserted in the backwards propagating beam 525 path (before the CCD 142) at S936A. In an aspect of the disclosure, the processor 300 may retrieve the rotation angle for the filter wheel for the mode specific filter 141C associated with the set mode. For example, the mode specific filter may be a band pass filter for a specific spectral band for the SFG mode. The processor 300 may cause the filter wheel to rotate to the specific angle (stored in memory 305). In some aspects of the disclosure, S936A may be omitted when system 1A is used and there is a dominant mode. At S938A, an SFG image 197 of the sample 150 is produced at the CCD 142. FIG. 15 illustrates an example configuration of the system 1 when the SFG mode is set. BB 2 170 is omitted from the figure as it is not blocking either beam. A $\lambda_i$ bandpass filter 141C is inserted after SP 140 and before CCD 142 in the backwards propagating beam path 525. FIG. 15 also shows an example of an SFG image 197 and spectral range $\lambda_j$ for SFG signals at two different time delays.

Figure 16:
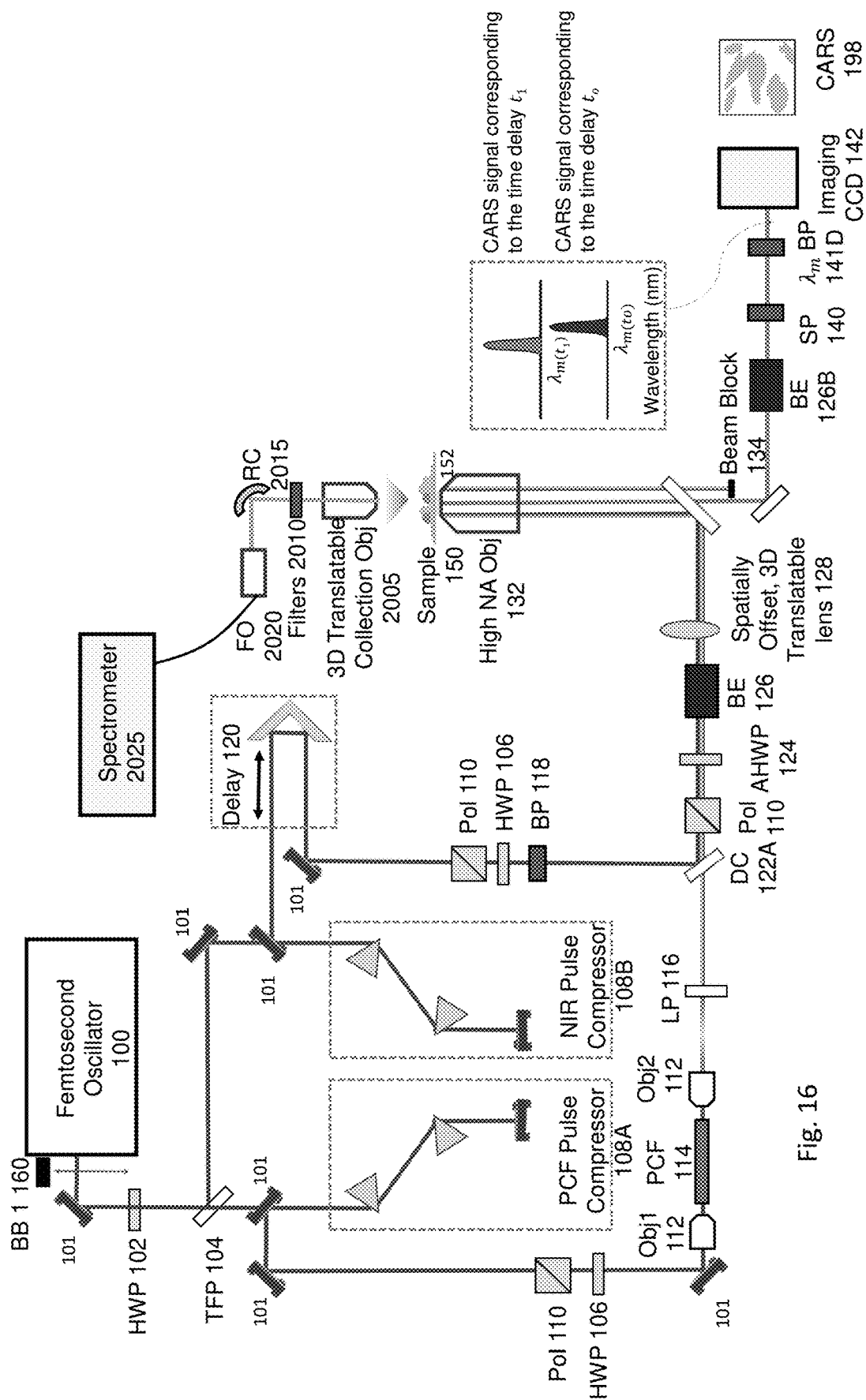
FIG. 16 illustrates an example of a configuration for the system in CARS mode and an example image in accordance with aspects of the disclosure.

If the mode selected is only for CARS image 198 (S934B), the processor 300 may cause a mode specific filter for the SFG mode (filter 141D) to be inserted in the backwards propagating beam 525 path (before the CCD 142) at S936B. In an aspect of the disclosure, the processor 300 may retrieve the rotation angle for the filter wheel for the mode specific filter 141D associated with the set mode. For example, the mode specific filter may be a band pass filter for a specific spectral band for the CARS mode. The processor 300 may cause the filter wheel to rotate to the specific angle (stored in memory 305). In some aspects of the disclosure, S936B may be omitted when system 1A is used and there is a dominant mode. At S938B, a CARS image 198 of the sample 150 is produced at the CCD 142. FIG. 16 illustrates an example configuration of the system 1 when the CARS mode is set. BB 2 170 is omitted from the figure as it is not blocking either beam. A $\lambda_m$ bandpass filter 141D is inserted after SP 140 and before CCD 142 in the backwards propagating beam path 525. FIG. 16 also shows an example of a CARS image 198 and spectral range $\lambda_m$ for CARS signals at two different time delays.

Figure 17:
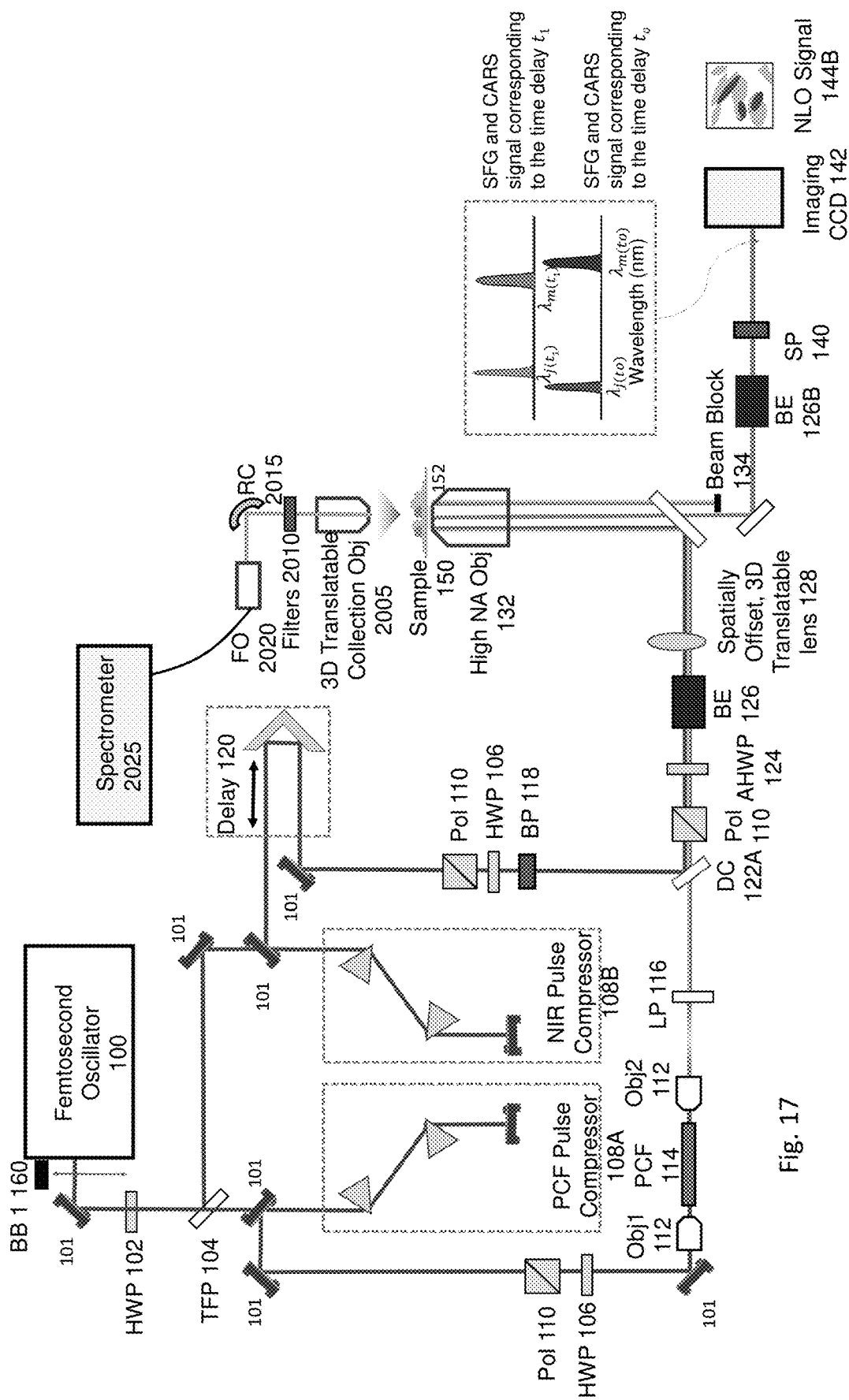
FIG. 17 illustrates an example of a configuration for the system in SFG mode and CARS mode and an example image in accordance with aspects of the disclosure.
Figure 18:
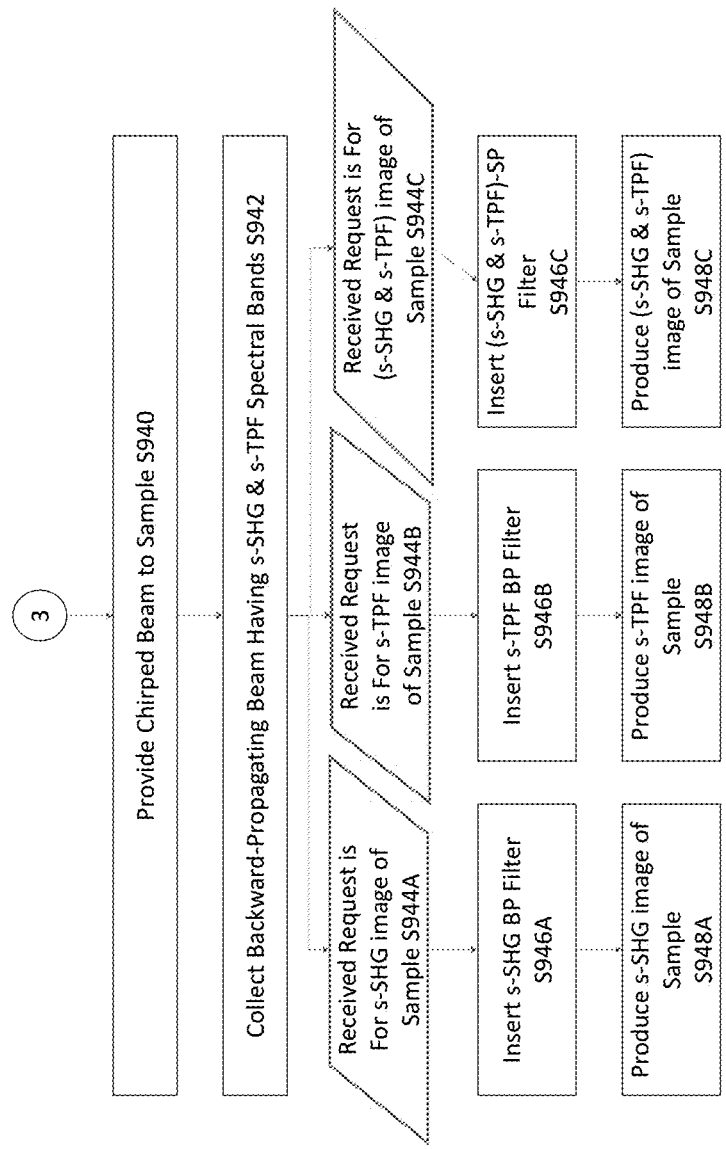

If the mode selected is for both a SFG 197 and CARS 198 (S934C), filter for both modes, e.g., both spectral bands may be used. In some aspects of the disclosure, the same SP filter 140 may be used given the spectral ranges $\lambda_j$ and $\lambda_m$. In this aspect of the disclosure, the processor 300 may control the filter wheel such that an empty slot in the filter wheel is in the path of the backwards propagating beam 525 path (before the CCD 142) at S936C. In other aspects of the disclosure, another 725 nm filter may be used to doubly filter the signal. In other aspects, a long pass filter may be used such that any signal from an SHG(P) may be filtered out. For example, a 420 nm long pass filter may be used. In an aspect of the disclosure, the processor 300 may retrieve the rotation angle for the filter wheel for the empty slot. At S938C, a combination image having all images SHG(S) 193, TPF(S) 194, SHG(P) 195, TPF(P) 196, SFG 197 and CARS 198 of the sample 150 is produced at the CCD 142. FIG. 17 illustrates an example configuration of the system 1 when the SFG image 197 and CARS image 198 is requested. FIG. 17 only shows signals from the CARS image 198 and SFG image 197. However, depending on the sample, the images from the other modes may be seen as well such as shown in FIG. 1B. Also depending on the sample, no TPF signals and weak SHG signals may be presented. Once again BB 2 170 is not shown because it is not blocking either beam. FIG. 17 also shows an example of a combination image having the SFG image 197 and CARS image 198 (combination 144B) and combined spectral range $\lambda_j$ and $\lambda_m$. In FIG. 17, no mode specific filter 141 is shown (which is the same as having the filter wheel in an empty slot).

When the determinations in S910A and S910B are NO, the set mode is for either s-SHG or s-TPF or a combination of both. SHG(S) 193 is the same as s-SHG and TPF(S) 194 is the same as s-TPF.

At S912C, the processor 300 determines the appropriate power ratio (level for the pump and Stokes beams). The processor 300 may determine the ratio based on any mode specific instructions received at S900. The processor 300 may also retrieve the allowable range for the ratio stored in memory 305 and set the power ratio based on the allowable range in combination with any mode specific instructions (allowable rotation angles). In an aspect of the disclosure, absence any mode specific instructions, the processor 300 may default to the highest signal for the specific mode (rotation angle that produces the same). For example, for SHG(S) 193 or TPF(S) 194, the highest ratio is 1:41. The processor 300 may also retrieve from memory 305 the information regarding the specific rotation angles to achieve that ratio, the rotation angle of the HWP 102 may be around 290 degrees. Once the rotation angle is determined, the processor 300 may control the DC rotating mount 315 to the determined rotation angle.

At S914C, the processor 300 may control the beam block 170 to selectively block the pump beam path and not block the chirped beam (Stokes) path. In an aspect of the disclosure, when the system 1/1A is initially turned ON, both beam paths may be blocked. For example, solenoid shutters in the paths may be controlled to be closed. In this aspect, the processor 300 may control the solenoid shutter in the path of the pump beam to remain close while controlling the solenoid shutter in the path of the chirped beam to be opened to allow the chirped beam (Stokes) to pass. When a single block is used, the processor 300 may cause the block to move positions to only block the pump beam, e.g., block the path for the pump beam. At S940, the chirped beam (Stokes) is provided to the sample via the disclosed optics. Since SHG(S) 193 or TPF(S) 194 is set or a combination thereof is set, at S942, a backwards propagating beam 525 having both s-SHG and s-TPF spectral bands is collected back through the objective 132 and optionally expanded by BE 126B (and filtered by SP 140).

Figure 19:
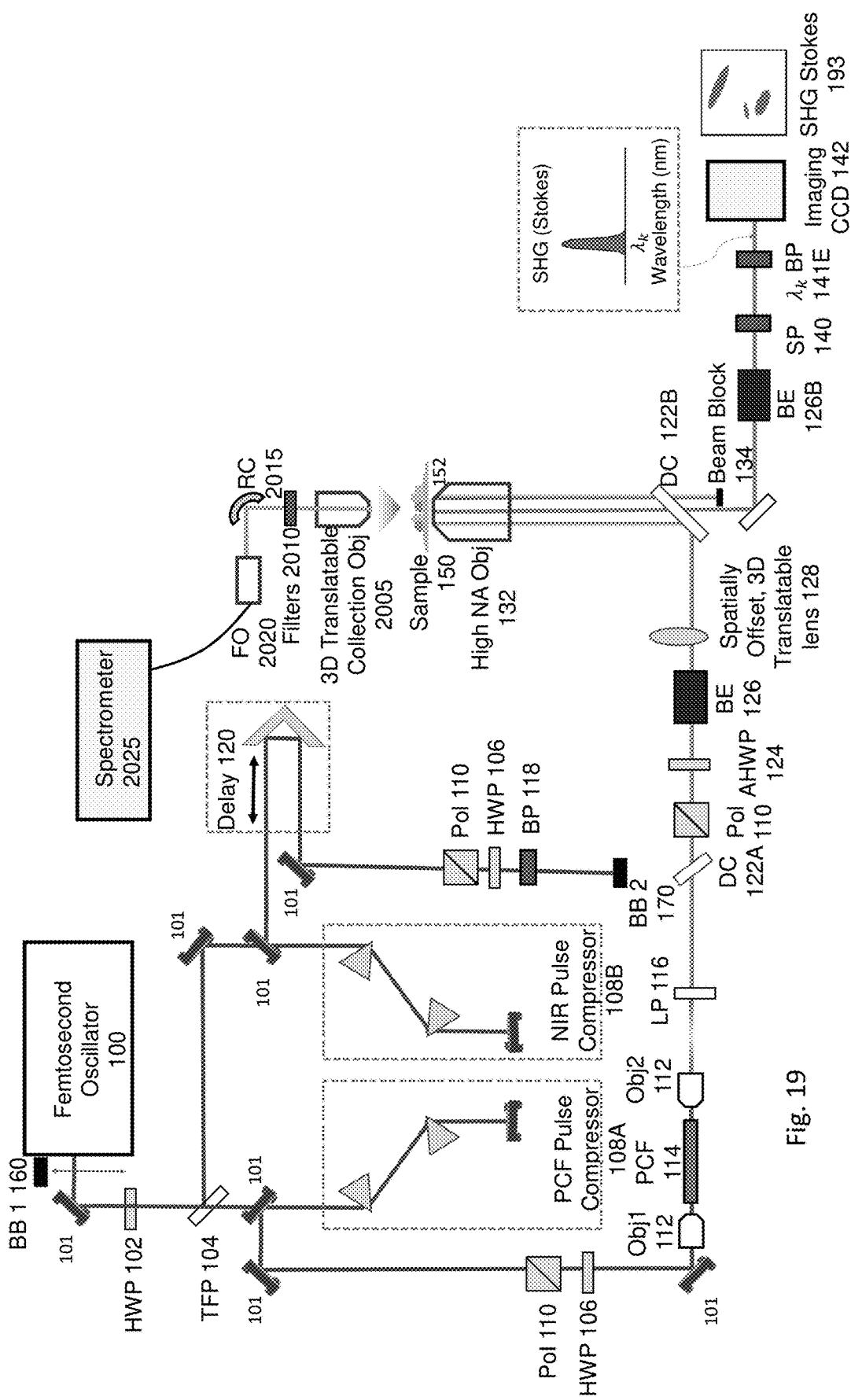
FIG. 19 illustrates an example of a configuration for the system in SHG (Stokes) mode and an example image in accordance with aspects of the disclosure.

If the mode selected is only for s-SHG image 193 (S944A), the processor 300 may cause a mode specific filter for the s-SHG mode (filter 141E) to be inserted in the backwards propagating beam 525 path (before the CCD 142) at S946A. In an aspect of the disclosure, the processor 300 may retrieve the rotation angle for the filter wheel for the mode specific filter 141E associated with the set mode. For example, the mode specific filter may be a band pass filter for a specific spectral band for the s-SHG mode ($\lambda_k$). The processor 300 may cause the filter wheel to rotate to the specific angle (stored in memory 305). In some aspects of the disclosure, S946A may be omitted when system 1A is used and there is a dominant mode. At S948A, an s-SHG image 193 of the sample 150 is produced at the CCD 142. FIG. 19 illustrates an example configuration of the system 1 when the s-SHG mode is set. As shown in FIG. 19, the BB 2 170 is positioned in the path of the pump beam and blocked. A $\lambda_k$ bandpass filter 141E is inserted after SP 140 and before CCD 142 in the backwards propagating beam 525 path. FIG. 19 also shows an example of an s-SHG image 193 and spectral range $\lambda_k$.

Figure 20:
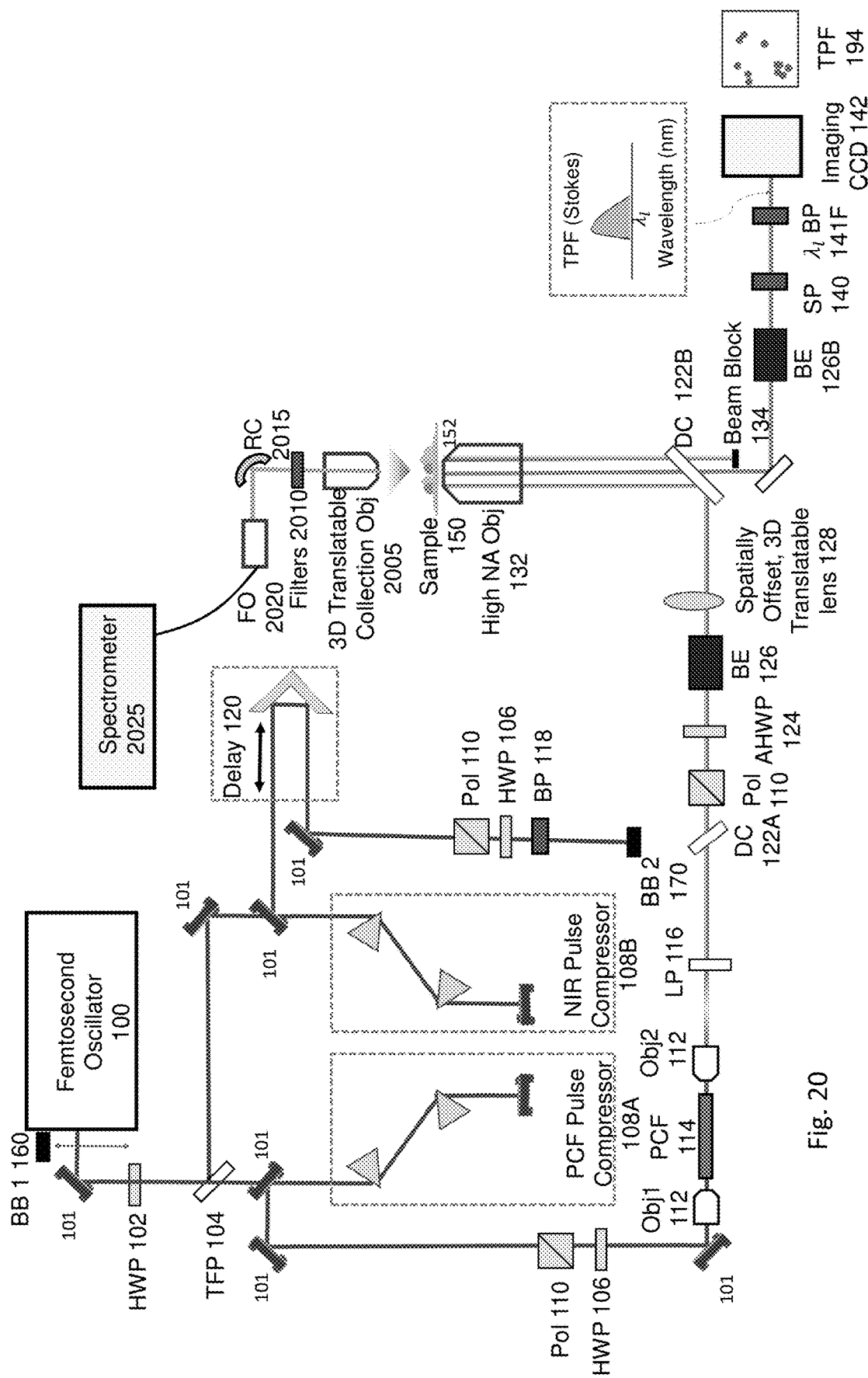
FIG. 20 illustrates an example of a configuration for the system in TPF (Stokes) mode and an example image in accordance with aspects of the disclosure.

If the mode selected is only for s-TPF image 194 (S944B), the processor 300 may cause a mode specific filter for the s-TPF mode (filter 141F) to be inserted in the backwards propagating beam 525 path (before the CCD 142) at S946B. In an aspect of the disclosure, the processor 300 may retrieve the rotation angle for the filter wheel for the mode specific filter 141F associated with the set mode. For example, the mode specific filter may be a band pass filter for a specific spectral band for the s-TPF mode ($\lambda_l$). The processor 300 may cause the filter wheel to rotate to the specific angle (stored in memory 305). In some aspects of the disclosure, S946B may be omitted when system 1A is used and there is a dominant mode. At S948B, an s-TPF image 194 of the sample 150 is produced at the CCD 142. FIG. 20 illustrates an example configuration of the system 1 when the s-TPF mode is set. As shown in FIG. 20, the BB 2 170 is positioned in the path of the pump beam and blocked. A $\lambda_l$ bandpass filter 141F is inserted after SP 140 and before CCD 142 in the backwards propagating beam 525 path. FIG. 20 also shows an example of an s-TPF image 194 and spectral range $\lambda_l$.

Figure 21:
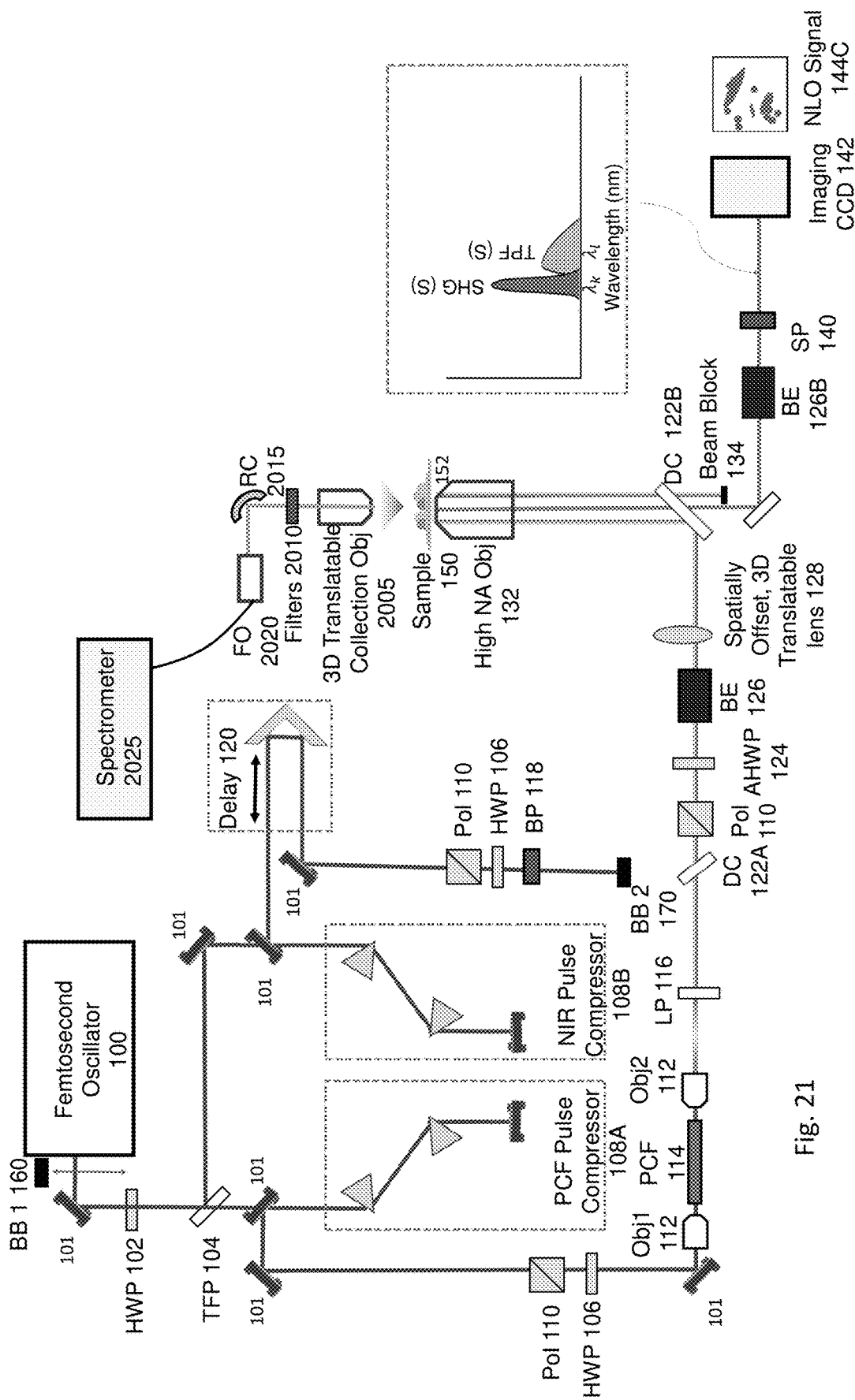
FIG. 21 illustrates an example of a configuration for the multimodal nonlinear optical imaging system in TPF (Stokes) mode and SHG (Stokes) mode and an example image in accordance with aspects of the disclosure.

If the mode selected is for both a s-SHG image 193 and s-TPF image 194 (S944C), filter for both modes, e.g., both spectral bands may be used. In some aspects of the disclosure, the same SP filter 140 may be used given the spectral ranges $\lambda_k$ and $\lambda_l$. In this aspect of the disclosure, the processor 300 may control the filter wheel such that an empty slot in the filter wheel is in the path of the backwards propagating beam 525 path (before the CCD 142) at S946C. In an aspect of the disclosure, the processor 300 may retrieve the rotation angle for the filter wheel for the empty slot. At S948C, a combination image (144C) having the s-SHG image 193 and s-TPF image 194 of the sample 150 is produced at the CCD 142. FIG. 21 illustrates an example configuration of the system 1 when the s-SHG image 193 and s-TPF image 194 is requested. As shown in FIG. 21, the BB 2 170 is positioned in the path of the pump beam and blocked. FIG. 21 also shows an example of a combination image 144C having the s-SHG image 193 and s-TPF image 194 and combined spectral range $\lambda_k$ and $\lambda_l$. In FIG. 21, no mode specific filter 141 is shown (which is the same as having the filter wheel in an empty slot).

The image data from multiple modes may overlap in spectrum. For example, when SFG 197 and CARS 198 images are desired, other modes may impact the image data. An SFG image 197 may be observed near about 450 nm and CARS images 198 may be observed near about 650 nm. Depending on the sample 150, the sample may have compositions that have fluorophores having fluorescents that overlaps either range. SHG(P) and SHG(S) images may be observed around 400 nm and 500 nm, respectively. Therefore, in accordance with aspects of the disclosure, in order to get a "purified" SFG image 197 and CARS 198 image, the image data obtained as described above, may need to be corrected by subtracting out image data from different modes. A purified image is an image free from extraneous light arising via spectrally overlapping signals. For example, an image may be obtained for a TPF mode. Another image may be obtained for either a CARS mode or a SFG mode. The image data from a TPF mode may be subtracted from either the CARS image 198 or the SFG image 197 to obtain the true image data.

EXAMPLES

An example of multiple mode imaging as described above was evaluated using a ternary test sample. The sample contained indole-3-acetic acid (IAA), malachite green oxalate dye (MG), and ZnS nanocrystals. IAA is a model biological signaling molecule with a variety of functional groups capable of generating vibrational/chemical contrast. Malachite green is a triarylmethane dye, which not only can emit fluorescence from both its $S_1$ and $S_2$ states, but also has been commonly used as an SHG probe in biological systems. ZnS nanocrystals are known for efficient generation of SHG, SFG, and CARS signals due to their intrinsic non-centrosymmetry and high nonlinear susceptibilities.

The sample 150 was prepared by first dissolving IAA in methanol, which was directly deposited on a glass coverslip (substrate) 152 and allowed to dry. Next, a solution of MG dye (1.5 mM in ethanol) was prepared and drop cast onto the same glass coverslip next to the existing IAA film while minimizing its spread. Finally, once both MG and IAA films were dry, ZnS microcrystals were sprinkled on the same coverslip in a third, empty spatial region.

The oscillator 100 was centered at 809 nm, had a repetition rate of 82 MHz at about 50 fs pulses (mode-locked femtosecond Ti: Sapphire laser (Tsunami, Spectra Physics)). The power split between the pump and Stokes paths was 3.1:1. The power of the pump pulses was controlled using the HWP and polarizer as described above. The pump beam was delayed as described above ((stepper motor driven delay stage (UTM150PP1HL, Newport)). The pulse compressors used SF 10 prisms. The PCF 14 was a SCG-800-CARS, Newport for supercontinuum generation using an objective 112 (0.40 NA, 20×). The output of the PCF was collimated using another objective 112 (0.45 NA, 40×), and spectrally filtered using a long-pass filter 116 (FEL0750, Thorlabs) to select the near-infrared portion of the supercontinuum as the Stokes pulse. The pump and Stokes beams were combined collinearly using an 808 nm long-pass filter (LP02-808RU-25, Semrock) (DC1 122A), which were then polarization purified and rotated using a polarizer 110 and an achromatic half-waveplate 124, respectively. After passing through a 4× reflective beam expander 126 (BE04R/M-4× Thorlabs), the beams were focused using an f=500 mm lens (AC508-500-A-ML. Thorlabs) onto the back focal plane of an oil-immersion high NA microscope objective 132 (Nikon, 1.49 NA, 100×).

The collected light was first magnified by a 4× beam expander 126 B and then spectrally filtered with a 750 nm short pass dichroic mirror (FF750-SDi02, Semrock) 122B in combination with a second optical filter mounted on a filter wheel, which was chosen depending on the imaging modality in order to reject residual excitation light. The filtered signal was imaged onto an intensified CCD camera 142 with 1024×1024 pixels (PI-MAX 7467-0028, Princeton Instruments). The field of view was determined to be 27.9 µm×27.9 µm using a test target (R3L1S4P, Thorlabs). The power of the beams at the sample 150 was measured. The fluence of beams at the sample was calculated from the measured power based on the illumination area, laser power and the repetition rate, the ratio and the controlled power of the pump (via the HWP and polarizer). The total fluence at the sample stage was about 72 fJ/µm². Images were acquired using both the pump beam and Stokes beam (image FIG. 22B, FIG. 22E, FIG. 22H, FIG. 22K and FIG. 22M), pump beam only (blocking the Stokes beam as described herein) (image FIG. 22C, FIG. 22F, FIG. 22I, FIG. 22L and FIG. 220), and Stokes beam only (blocking the pump beam as described herein) (image FIG. 22D, FIG. 22G, FIG. 22J, FIG. 22M and FIG. 22P). Five different images were acquired under each of the above conditions with different filters. The filters were 725 nm short pass filter (#86-103, Edmund optics) for images FIG. 22B-FIG. 22D, 650 nm band pass filter for images FIGS. 22E-22G, 550 nm band pass filter for images FIGS. 22H-22J, 450 nm band pass filter for images FIGS. 22K-22M, and 400 nm band pass filter for images FIGS. 22N-22P.

Boundaries between the three chemical distinct regions were identified via a brightfield image as shown in FIG. 22A. The brightfield image was acquired using a deuterium light source illuminated from the top side of the sample.

All images were background subtracted using a camera exposure for the same duration in the absence of incident light. The exposure time was 30 s to obtain images without hardware binning.

Images FIGS. 22B-22D show clear spatial features that correspond to those observed in the brightfield image FIG. 22A. When both the pump and the Stokes beams were incident on the sample (FIG. 22B), a CARS signal was observed in the IAA film (area 1) (annotated in FIG. 22B with "1". The CARS signal was confirmed by its disappearance upon blocking either of the beams (area 1 in FIG. 22C or FIG. 22D).

The signal from the MG dye (area 2) (identified in FIG. 22B with "2") consists of both CARS and two-photon fluorescence contributions in the presence of both beams as shown in FIG. 22B. However, when the Stokes beam was blocked as shown in image FIG. 22C, area 2, only the two-photon fluorescence signal dominates, along with possibly weak SHG contribution. Furthermore, the nonlinear optical responses from the ZnS nanocrystals (area 3) (identified in FIG. 22B as "3" could contain multiple contributions from CARS, SHG induced by either the pump or the Stokes, respectively, as well as the SFG by the pump and Stokes pulses.

In the presence of a single beam, either the pump or the Stokes, only SHG should contribute, leading to reduced overall signal intensity due to the absence of CARS and SFG signals as seen in area 3 in FIGS. 22C and 22D. The corresponding variations in area 2 are much more pronounced, manifesting by clear disappearance of either distinct spatial feature as seen in FIG. 22D or overall signal as shown in FIG. 22C.

FIGS. 22E-22P further provide information on the exact origins (non-linear responses) of the radiated signal since different band pass filters were used during image acquisition to spectrally separate the different non-linear responses based on the characteristic wavelengths. For example, the use of the 650 nm BP (with a full-width at half max, FWHM, of 40 nm) for image FIG. 22E allows for the observation of a CARS signal from all three components of the sample when both beams are used. This is the only nonlinear signal anticipated here that would generate light in the 650 nm region in the presence of both beams and for all three samples.

The two-photon fluorescence from the $S_1$ state of MG is found at ~670 nm as shown in image FIG. 22E, which can be separated from the CARS contribution by blocking the Stokes beam while keeping the same 650 nm bandpass filter as shown in image FIG. 22F. Allowing only the Stokes beam in (blocking the pump beam), no two-photon fluorescence is seen as illustrated in image FIG. 22G.

The two-photon fluorescence from the $S_2$ state of MG is observed at 510 nm, which can be isolated using a 500 nm bandpass filter (84-783, 50 nm FWHM, Edmund Optics) such as shown in images FIGS. 22H and 22I. In addition, the SHG signal from ZnS nanocrystals induced by the Stokes beam (centered at ~1000 nm) can be also isolated with the same 500 nm bandpass filter as shown in image FIG. 22J.

The SFG and pump derived SHG signals from the ZnS nanocrystal can be separated using a 450 nm band-pass filter (86-653, 25 nm FWHM, Edmund optics) and a 400 nm band-pass filter (FF01-400/40-25, 40 nm FWHM, Semrock), respectively. A straightforward verification of this SFG signal at ~450 nm is to block either of these incident beams and the signal should disappear, which is indeed observed as can be seen in images FIGS. 22L and 22M. Image FIG. 22N illustrates a strong SHG(P), a negligible SHG(S) (which is confirmed by image FIG. 22P) and a weak SFG. When the Stokes beam is blocked (pump beam only), the weak SFG and SHG(S) disappear. In contrast, image FIG. 22K illustrates a strong SFG and a weak SHG(P) and once again a negligible SHG(S) (which is confirmed by image FIG. 22M).

Accordingly, FIGS. 22B-22P show that nonlinear optical images containing complementary information can be acquired with modest exposure times (such as less than 100 ms)

The system as described herein may also be used on biological samples. The system was tested on a sample of pollen of a Oakleaf hydrangea flower (*Hydrangea quercifolia*). Pollen grains are complex biological systems involving many biochemical components such as carbohydrates, proteins, lipids, carotenoids, and many other intrinsic fluorophores, making them well suited for multimodal imaging. a multimodal imaging technique capable of obtaining both chemical and morphological information simultaneously are more beneficial for palynological studies.

Figure 23C:
FIGS. 23A-23C illustrate images from a pollen sample from Oakleaf hydrangea flowers in accordance with aspects of the disclosure, where
Figure 23B:
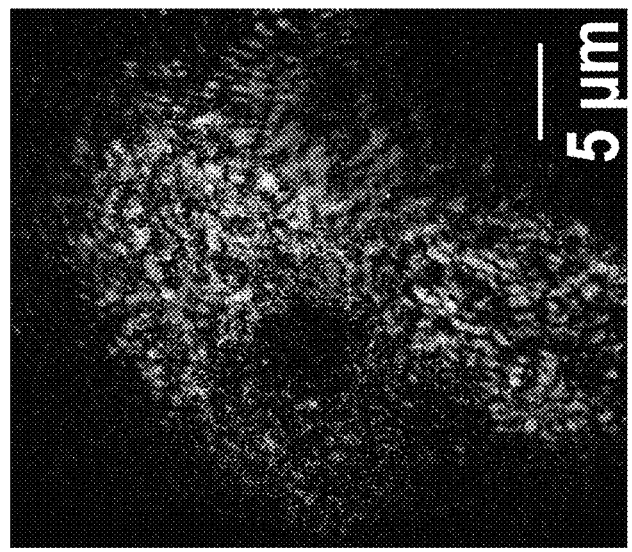
Figure 23A:

A brightfield image, a CARS image and a TPF image was acquired. The CARS and TPF images were acquired where the total fluence was about the same as described above. Image FIG. 23A is the brightfield image. The pollen grains can be clearly seen in FIG. 23A. Image FIG. 23C is an TPF image. This image was isolated (obtained) using a 500 nm band pass filter. Auto-fluorescence signal from the intrinsic fluorophores was observed at about 500 nm to 600 nm and is likely due to the presence of flavins and flavonoids. Image FIG. 23B is a composite CARS image of two wavenumbers. To differentiate the signals two colors are shown in image FIG. 23B. Measurement at wavenumber 2850 $cm^{-1}$ is shown in green and 1600 $cm^{-1}$ is shown in purple (two different delays). The wavenumber 2850 $cm^{-1}$ shows a distribution of C—H molecular group, and 1600 $cm^{-1}$ shows a distribution of C═C molecular group. Vibrational resonance at ~2850 $cm^{-1}$ corresponds to the lipids of the pollen membrane and other aliphatic species. The C═C bonds likely correspond to polyene stretches found in the carotenoids.

The TPF image (Image FIG. 23C) was acquired while blocking the Stokes beam (only pump beam). Image FIG. 23B was determined by subtracting the signal of the TPF image (FIG. 23C) with the same exposure time (adjusted image).

Image FIG. 23B (composite CARS) shows clearly spatial heterogeneities, which can arise from differences in chemical localization or through 'shadowing' effects found in the linear analogs of TIR-fluorescence microscopes or from the complex three-dimensional structure of the pollen grains. Since the TIR excitation preferentially probes species near/at the coverslip surface, species located further from the surface do not generate as much signal owing to the exponentially decaying evanescent field. This means that for three-dimensional biological structures that are larger than the evanescent field penetration depth, such as pollen grains, there will be variations in the measured signals that arise from both the proximity of the species to the surface and the respective chemical population. Thus, the intensity of a given signal may encode both the population and the z-position away from the sample-substrate interface.

The system described herein may also be used for imaging live cells. A fixed *Pantoea* sp. YR343 cells was used as the sample. These fixed cells of the rhizosphere bacterium *Pantoea* sp. YR 343 were grown and processed. The cells were adhered to a polylysine coated glass coverslip and stored in water before experiments. Immediately prior to measurement, a 1:1 mixture of SYTO9 and propidium iodide (PI) dyes were administered as live/dead stains to determine the effect of the imaging on the cells. SYTO9 is a cell permeable DNA dye that fluoresces at about 500 nm, whereas the PI dye emits fluorescence at 620 nm but is cell-impermeable and only stains the DNA of cells with compromised membranes. As such, by spectrally resolving these fluorescence emission signals using proper bandpass filters and imaging the resulting radiated light, the viability of the cells during imaging (such as CARS) may be determined. The coverslips with dye and adhered cells were mounted in the microscope sample holder and a moist filter paper was kept close to the coverslip to create a humid environment for the cells.

Figure 24D:
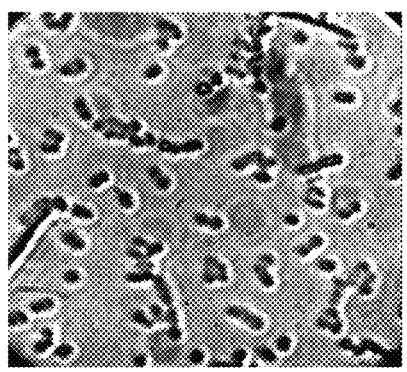
FIGS. 24A-24D illustrate images from a *Pantoea* sp. YR343 where
Figure 24C:
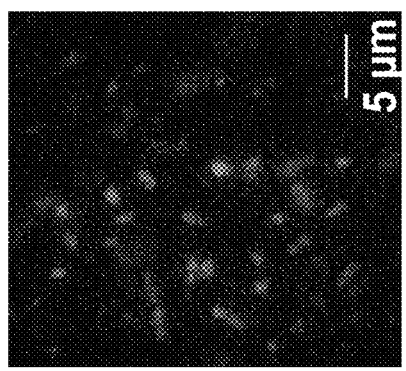
Figure 24B:
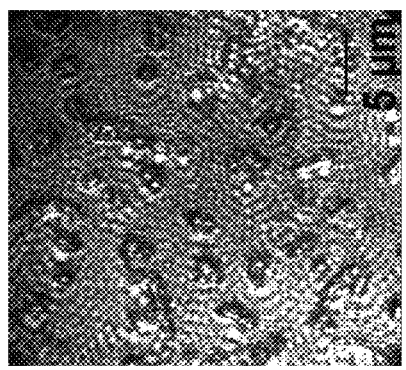
Figure 24A:
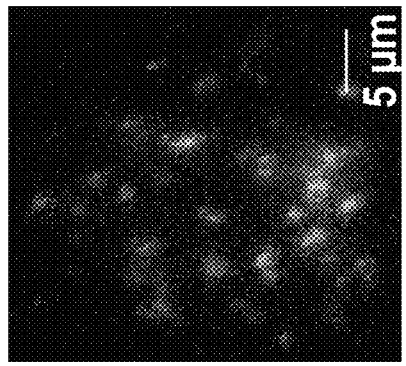

Image FIG. 24A illustrate the brightfield image of the cells before exposure to laser light (either the pump beam or Stokes beam).

Image FIG. 24B is a composite TPF image collected using different bandpass filters (centered at 500 nm and 650 nm, respectively), which shows that most of the cells within the field of view are alive (green) with only a few dead cells (red). The Stokes beam was blocked with the beam block. The power was regulated to have a pump: Stokes ratio of 4:1. Immediately after the completion of this TPF image acquisition, a CARS image was obtained at 2850 $cm^{-1}$ as shown in FIG. 24C with an exposure time of 10 s and a total fluence of about 62 fj/$\mu m^2$ at the sample stage. As shown in image FIG. 24C, individual cells are clearly visible in the CARS image with a sufficiently high SNR even for such a modest exposure time. The spatial pattern observed in the CARS image is likely due to evanescent field scattering, which is a common observation found in linear TIR microscopic images. Regardless of these artifacts, a clear contrast between the cells and the substrate is found that coincides with the cellular positions seen in the brightfield image (Image FIG. 24A) indicating that while interpretation of small variations in intensity might be prohibitive, larger scale variations are robust and reflective of real spatial heterogeneity. Another set of TPF images was immediately acquired after the CARS to determine whether the CARS image caused substantial cell degradation. Image FIG. 24D is a composite TPP image collected in a similar manner as image FIG. 24B.

While some cells do appear to have died as more red spots appear in the image than those seen in image FIG. 24B, but notably, a majority of the cells still remain intact. The results shown image FIGS. 24A-24D demonstrate that the system is capable of not only directly probing vibrational contrast from living systems but also assessing the viability of live cells using the co-registered imaging modalities such as TPF imaging, along with accessing morphological information using brightfield and SHG imaging, etc.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein terms such as "a", "an" and "the" are not intended to refer to only a singular entity but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for multimodal nonlinear optical imaging, the system comprising:
    an oscillator configured to emit femtosecond pulses of light centered at a preset wavelength;
    a beam splitter disposed in a path of the emitted pulses of light and configured to split the emitted light into pulses for a first beam and a second beam;
    a photonic crystal fiber disposed in a path of the second beam and configured to produce pulses for a chirped beam;
    a controllable beam block configured to selectively block a path of the first beam or the chirped beam or neither the first beam nor the chirped beam in response to a mode-selection;
    objective optics configured to receive, based on the selected insertion of the beam block, at least one beam, the at least one beam being either the first beam or the chirped beam or both the first beam and the chirped beam, wherein, if both the first beam and the chirped beam are received by the objective optics, the first beam and the chirped beam are spatially and temporally aligned, redirect the at least one received beam through a dielectric substrate towards an interface between a sample and a dielectric substrate to cause total internal reflection (TIR) of at least one redirected beam at the sample-substrate interface, wherein the sample is disposed on the dielectric substrate, wherein the dielectric substrate is transparent to both the first beam and the chirped beam, and produce corresponding evanescent waves in a portion of the sample adjacent to the sample-substrate interface, wherein the portion of the sample illuminated by the evanescent waves emits responsive light, wherein the dielectric substrate is transparent to the responsive light emitted by the portion of the sample, and wherein the responsive light has a spectrum that comprises a first-beam-induced second-harmonic generation (p-SHG) spectral band and a first-beam-induced two-photon fluorescence (p-TPF) spectral band, (ii) a chirped-beam-induced second-harmonic generation (s-SHG) spectral band and a chirped-beam-induced two-photon fluorescence (s-TPF) spectral band, (iii) the p-SHG spectral band, the p-TPF spectral band, the s-SHG spectral band, the s-TPF spectral band, a sum-frequency generation (SFG) spectral band and a coherent anti-Stokes Raman scattering (CARS) spectral band, and collect a backwards-propagating beam of pulses of responsive light that propagates from the portion of the sample through the dielectric substrate towards the objective optics;

a filter module configured to receive, from the objective optics, the backwards-propagating beam, and selectively filter the spectrum of the responsive light in one or more of the p-SHG spectral band, the SFG spectral band, the s-SHG spectral band, the s-TPF spectral band, the CARS spectral band, or the p-TPF spectral band in accordance with the mode-selection to produce a filtered beam; and a camera configured to produce an image of the sample having a specific image size using the filtered beam.

2. The system of claim 1, wherein the controllable beam block comprises a first solenoid shutter and a second solenoid shutter, the first solenoid shutter positioned in the path of the first beam and being configured to open or close to selectively block the first beam and the second solenoid positioned in the path of the chirped beam and configured to open or close to selectively block the chirped beam, wherein the system further comprises a processor configured to control a state of the first solenoid shutter and the second solenoid shutter.

3. The system of claim 1, wherein the controllable beam block comprises a motor, wherein the system further comprises a processor configured to control the motor to position the controllable beam block in the path of the first beam or in the path of the chirped beam or neither in the path of the first beam nor the chirped beam.

4. The system of claim 1, further comprising a power regulator configured to provide a power ratio of the first beam and the second beam, the power ratio being based on the mode-selection.

5. The system of claim 4, wherein the power regulator comprises a rotatable half waveplate and the system further comprising a processor configured to rotate the rotatable half waveplate based on the mode-selection.

6. The system of claim 1, wherein the filter module comprises a short pass filter.

7. The system of claim 6, wherein the filter module further comprises a plurality of selectable filters, where the selected filter is based on the mode-selection.

8. The system of claim 7, further comprises a processor configured to position a selected filter from among the plurality of filters in a path of the received backwards-propagating beam from the objective optics.

9. The system of claim 8, further comprising a filter wheel comprising the plurality of selectable filters, and wherein one of the spaces in the filter wheel for a filter is empty and is selectable as the filter.

10. The system of claim 1, further comprising a user interface configured to receive the mode-selection.

11. The system of claim 10, wherein the mode-selection contains a request for an image generated from one or more imaging modalities.

12. The system of claim 11, wherein the received mode-selection comprises a request for a p-SHG image of the sample, a p-TPF image of the sample or a combined p-SHG and p-TPF image of the sample, the controllable beam block is configured to block the path of the chirped beam when the request is for the p-SHG image of the sample, the p-TPF image of the sample or the combine p-SHG and p-TPF image of the sample, the objective optics is configured to receive the first beam, redirect the received first beam through the dielectric substrate towards the sample-substrate interface to cause TIR of the redirected first beam at the sample-substrate interface, and produce corresponding evanescent waves in the portion of the sample adjacent to the sample-substrate interface, wherein the portion of the sample illuminated by the evanescent waves emits the responsive light having a spectrum formed from the p-SHG spectral band and the p-TPF spectral band, and when the request is for the p-SHG image of the sample, the filter module is configured to filter the spectrum of the responsive light in the p-SHG spectral band, and the camera is configured to produce the requested p-SHG image of the sample using the filtered beam, or when the request is for the p-TPF image of the sample, the filter module is configured to filter the spectrum of the responsive light in the p-TPF spectral band, and the camera is configured to produce the requested p-TPF image of the sample using the filtered beam, or when the request is for the combined p-SHG and p-TPF image of the sample, the filter module is configured to filter the spectrum of the responsive light in the p-SHG spectral band and the p-TPF spectral band, and the camera is configured to produce the requested combined p-SHG and p-TPF image of the sample using the filtered beam.

13. The system of claim 10, wherein the received mode-selection comprises a request for a s-SHG image of the sample, a s-TPF image of the sample or a combined s-SHG and s-TPF image of the sample, the controllable beam block is configured block the path of the first beam when the request is for the s-SHG image of the sample, the s-TPF image of the sample or the combined s-SHG and s-TPF image of the sample, the objective optics is configured to receive the chirped beam, redirect the received chirped beam through the dielectric substrate towards the sample-substrate interface to cause TIR of the redirected chirped beam at the sample-substrate interface, and produce corresponding evanescent waves in the portion of the sample adjacent to the sample-substrate interface, wherein the portion of the sample illuminated by the evanescent waves emits the responsive light having a spectrum formed from the s-SHG spectral band and the s-TPF spectral band, and when the request is for the s-SHG image of the sample,
the filter module is configured to filter the spectrum of the responsive light in the s-SHG spectral band, and
the camera is configured to produce the requested s-SHG image of the sample using the filtered beam, or when the request is for the s-TPF image of the sample,
the filter module is configured to filter the spectrum of the responsive light in the s-TPF spectral band, and
the camera is configured to produce the requested s-TPF image of the sample using the filtered beam, or when the request is for the combined s-SHG and s-TPF image of the sample,
the filter module is configured to filter the spectrum of the responsive light in the s-SHG spectral band and the s-TPF spectral band, and
the camera is configured to produce the requested combined s-SHG and s-TPF image of the sample using the filtered beam.

14. The system of claim 10, wherein the received mode-selection comprises a request for a SFG image of the sample, a CARS image of the sample or a combined SFG and CARS image of the sample, and the path for both the first beam and the chirped beam is unblocked by the controllable beam block, the objective optics is configured to receive the first beam and the chirped beam, redirect the received first beam and the chirped beam through the dielectric substrate towards the sample-substrate interface to cause TIR of the redirected first beam and chirped beam at the sample-substrate interface, and produce corresponding evanescent waves in the portion of the sample adjacent to the sample-substrate interface, wherein the portion of the sample illuminated by the evanescent waves emits the responsive light having a spectrum formed from at least the SFG spectral band and the CARS spectral band, and when the request is for the SFG image of the sample,
the filter module is configured to filter the spectrum of the responsive light in the SFG spectral band, and
the camera is configured to produce the requested SFG image of the sample using the filtered beam, or when the request is for the CARS image of the sample,
the filter module is configured to filter the spectrum of the responsive light in the CARS spectral band, and
the camera is configured to produce the requested CARS image of the sample using the filtered beam, or when the request is for the combined SFG and CARS image of the sample,
the filter module is configured to filter the spectrum of the responsive light in the SFG spectral band and the CARS spectral band, and
the camera is configured to produce the requested combined SFG and CARS image of the sample using the filtered beam.

15. The system of claim 14, wherein when the request for the CARS image or the combined SFG and CARS image and there is overlap with the spectrum formed from the p-TPF or s-TPF, the system is configured to correct the CARS image or the combined SFG and CARS image.

16. The system of claim 15, wherein the correction comprises obtaining the p-TPF image or the s-TPF image by controlling the controllable beam block to block the path of the chirped beam and controlling the filter module to filter the spectrum of the responsive light in the p-TPF band or the s-TPF band and subtracting data from the p-TPF image or the s-TPF image from data from the CARS image or combine SFG and CARS image.

17. The system of claim 4, wherein the power ratio is further based on a sample type.

18. The system of claim 1, wherein the system produces multimodal images of an opaque sample.

19. The system of claim 1, wherein, when the sample is transparent to the responsive light, the system further comprises collection optics configured to collect forward-propagating responsive beam that propagates from the portion of the sample towards the objective optics, and a spectrograph configured to receive, from the collection optics, the forward-propagating beam from the portion of the sample and produce a spectrum of the responsive light corresponding to the sample using the received forward-propagating beam.

20. The system of claim 1, wherein an illumination area of the sample and an image size are independently controllable.

21. The system of claim 1, wherein the first beam and the chirped beam that are incident on the sample are P-polarized.

* * * * *